(12) United States Patent
Ravishankar et al.

(10) Patent No.: US 9,722,789 B2
(45) Date of Patent: Aug. 1, 2017

(54) METHOD AND SYSTEM FOR PROVIDING ENHANCED DATA ENCRYPTION PROTOCOLS IN A MOBILE SATELLITE COMMUNICATIONS SYSTEM

(71) Applicant: Hughes Network Systems, LLC, Germantown, MD (US)

(72) Inventors: Channasandra Ravishankar, Germantown, MD (US); Gaguk Zakaria, College Park, MD (US); Nassir Benammar, Rockville, MD (US); John Corrigan, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/265,330

(22) Filed: Apr. 29, 2014

(65) Prior Publication Data

US 2015/0052360 A1    Feb. 19, 2015

Related U.S. Application Data

(60) Provisional application No. 61/817,315, filed on Apr. 29, 2013.

(51) Int. Cl.
*H04L 9/14*     (2006.01)
*H04W 12/04*    (2009.01)
(Continued)

(52) U.S. Cl.
CPC .............. *H04L 9/14* (2013.01); *H04L 9/0819* (2013.01); *H04L 9/0841* (2013.01);
(Continued)

(58) Field of Classification Search
None
See application file for complete search history.

(56) References Cited

U.S. PATENT DOCUMENTS

| 6,373,946 B1 | 4/2002 | Johnston |
| 7,380,124 B1 | 5/2008 | Mizell et al. |

(Continued)

FOREIGN PATENT DOCUMENTS

| EP | 1911310 B1 | 4/2008 |
| JP | 2006094241 A * | 4/2006 |

(Continued)

OTHER PUBLICATIONS

USPTO, "International Search Report & Written Opinion", PCT App. No. PCT/US2014/035964, Aug. 20, 2014.
(Continued)

*Primary Examiner* — Michael R Vaughan
(74) *Attorney, Agent, or Firm* — Potomac Technology Law, LLC

(57) ABSTRACT

An approach for improved security protocols in a mobile satellite system is provided. A remote terminal performs a key establishment function, including determination of a first encryption key for encrypting data for transmission over the satellite communications channels, and determination of an authentication key for authenticating entities communicating over the communications channels. The remote terminal receives a security mode command including a key indicator, and determines a second encryption key for enhanced session data security over communications channels. The second encryption key is determined based on the key indicator and a key generation algorithm. The remote terminal further determines a key indicator response and transmits a security mode complete command including the key indicator response to a satellite base station subsystem (SBSS). The key indicator response is constructed for the SBSS to determine the second encryption key based on the key indicator response and a key generation algorithm.

21 Claims, 20 Drawing Sheets

(51) Int. Cl.
  *H04L 9/08* (2006.01)
  *H04L 29/06* (2006.01)
  *H04W 84/06* (2009.01)
  *H04W 12/02* (2009.01)
  *H04W 76/02* (2009.01)

(52) U.S. Cl.
  CPC ......... *H04L 63/0428* (2013.01); *H04W 12/04* (2013.01); *H04W 84/06* (2013.01); *H04L 2209/24* (2013.01); *H04L 2209/80* (2013.01); *H04W 12/02* (2013.01); *H04W 76/022* (2013.01)

(56) References Cited

U.S. PATENT DOCUMENTS

| | | |
|---|---|---|
| 2003/0046238 A1 | 3/2003 | Nonaka et al. |
| 2005/0026607 A1 | 2/2005 | Hwang et al. |
| 2006/0078121 A1* | 4/2006 | Luk .................. H04L 9/006 380/255 |
| 2007/0171848 A1 | 7/2007 | Fujii et al. |
| 2011/0305339 A1 | 12/2011 | Norrman et al. |
| 2012/0033815 A1* | 2/2012 | Kuo ...................... H04W 12/04 380/272 |
| 2015/0006908 A1* | 1/2015 | Mori ................. G06F 17/30289 713/189 |

FOREIGN PATENT DOCUMENTS

| | | |
|---|---|---|
| WO | WO03084177 A1 | 10/2003 |
| WO | WO2005027559 A1 | 3/2005 |
| WO | WO2009132598 A1 | 11/2009 |

OTHER PUBLICATIONS

EPO, "Extended European Search Report", EPO Appl. No. 14791753.8, Oct. 4, 2016.

Kaufman, "Internet Key Exchange (IKEv2) Protocol", Network Working Group, RFC-4306, Microsoft, Dec. 2005, Dec. 2005.

* cited by examiner

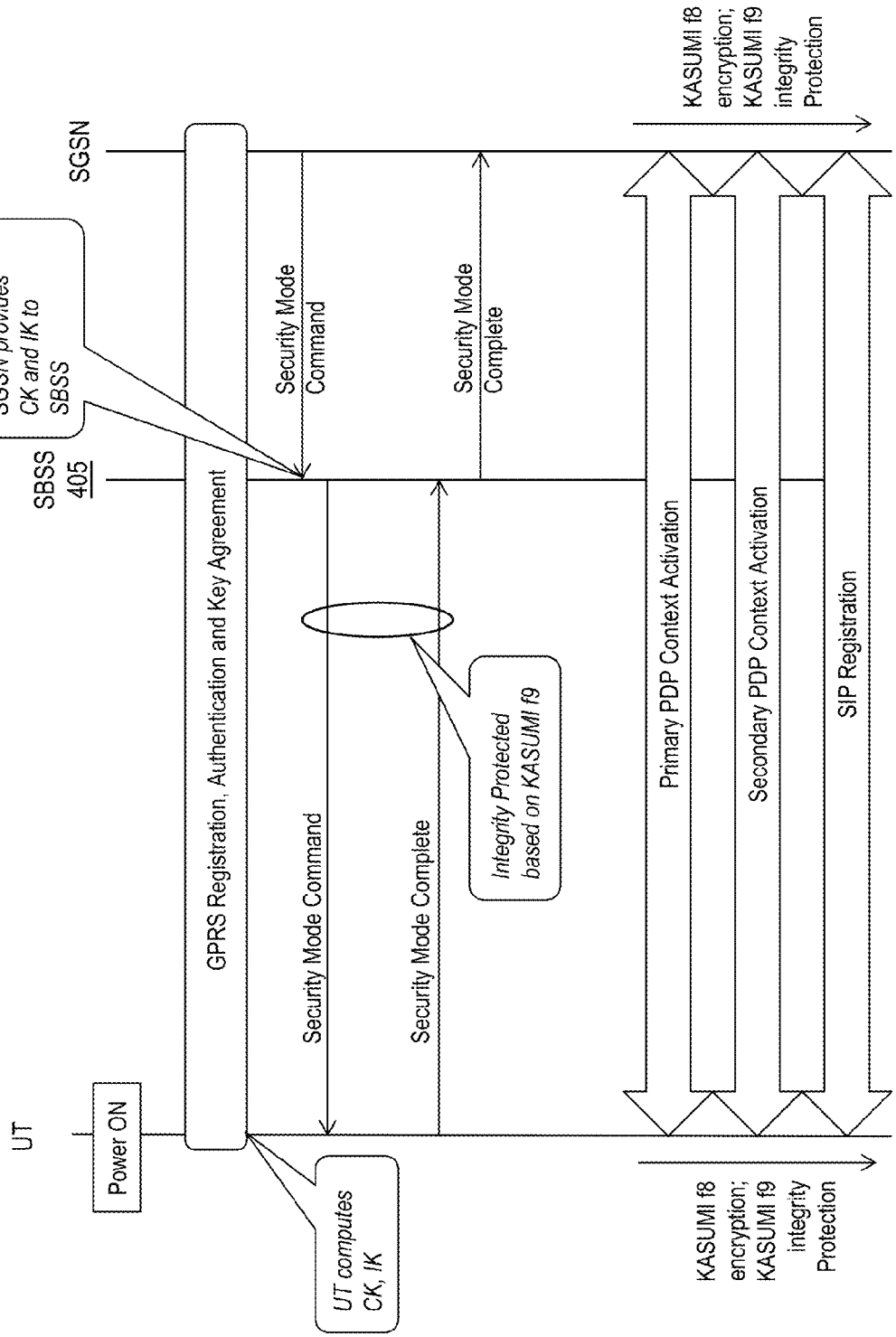

METHOD AND SYSTEM FOR PROVIDING ENHANCED DATA ENCRYPTION PROTOCOLS IN A MOBILE SATELLITE COMMUNICATIONS SYSTEM

RELATED APPLICATIONS

This application claims the benefit of the earlier filing date under 35 U.S.C. §119(e) of U.S. Provisional Application Ser. No. 61/817,315(filed 2013 Apr. 29).

BACKGROUND

Terrestrial communications systems continue to provide higher and higher speed multimedia (e.g., voice, data, video, images, etc.) services to end-users. Such services (e.g., Third Generation (3G) services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel with such terrestrial architectures and systems, mobile satellite systems are being designed to complement and/or co-exist with terrestrial coverage depending on spectrum sharing rules and operator choice. Among such mobile satellite systems, 3G UMTS-based networks using terrestrial 3G protocols have been widely deployed all over the world.

Terrestrial and satellite telecommunications services, rely on protocols and networking architectures that offer great flexibility and robustness. Mobile satellite systems advantageously use terrestrial 3G protocols in non-access stratum to allow interaction with terrestrial core networks and exploit widespread availability of terrestrial protocol stacks in user terminals. With regard to security, the terrestrial 3G protocols used by mobile satellite systems include security aspects such as SIM-based authentication, authorization and key agreement protocols. Radio access stratum in mobile satellite systems are typically optimize for the satellite environment, and therefore tend to be different than their terrestrial counterparts. Satellite base stations in user terminal chipsets that incorporate access stratum protocols and functions specific to satellite operation are readily developed and deployed. The access stratum security itself, however, is based on keys generated via the terrestrial 3G non-access stratum protocols, and hence rely on current states of such terrestrial 3G protocols (e.g., protocols based on 128 bit keys).

Moreover, applications and services requiring a high level of security (which at one time were addressed through proprietary segregated and highly secure systems and architectures (e.g., military and law enforcement systems), increasingly rely on broader-based commercial systems. Mobile satellite communications systems, based on their ability to reach diverse geographic regions without investment in significant ground-based infrastructure, are widely used for such high-security systems (e.g., military and law enforcement systems). This allows such high security services to be able to interoperate with broad-based commercial systems, and leverage the technology advancements and extensive infrastructure of such systems. Along with the proliferation of such high-security services, and the associated advancements in supporting technologies, security risks remain an ever-increasing threat. Accordingly, there is an ever increasing need for continued development of security architectures and protocols to combat such security risks.

There exists an increasing need, therefore, for improved security protocols in such 3G mobile satellite systems (e.g., security protocols based on extended key lengths).

SOME EXAMPLE EMBODIMENTS

The present invention advantageously addresses the foregoing requirements and needs, as well as others, by providing a system, architectures for the support of advanced security protocols, such as security protocols based on extended key lengths (e.g., key lengths of 256 bits).

In accordance with example embodiments of the present invention, a method comprises performing, by a terminal in a communications network, a key establishment function, including determination of a first encryption key for encrypting data to be transmitted over one or more channels of the communications network, and determination of an authentication key for authenticating entities communicating over the channels of the communications network. The method further comprises receiving a security mode command including a key indicator, and determining a second encryption key for enhanced session data security over the channels of the communications network, wherein the second encryption key is determined based on the key indicator and a first key algorithm. The method further comprises determining a key indicator response and transmitting a security mode complete command including the key indicator response, wherein the key indicator response is constructed to enable determination of the second encryption key based on the key indicator response and a second key algorithm. Based on the method, one or more packet data protocol (PDP) context activation processes can be performed over at least one of the channels of the communications network, wherein messaging for the PDP context activation processes is encrypted prior to transmission, wherein the encryption of the messaging is based at least in part on the second encryption key. Further, session data can be encrypted for transmission over the one or more channels of the communications network, wherein the encryption of the session data is based at least in part on the second encryption key.

In accordance with further example embodiments of the present invention, an apparatus, comprises one or more processors, at least one memory including computer program code for one or more programs, the at least one memory and the computer program code configured to, with the one or more processors, cause the apparatus to perform various functions. The functions comprise performing a key establishment function, including determination of a first encryption key for encrypting data to be transmitted over one or more channels of the communications network, and determination of an authentication key for authenticating entities communicating over the channels of the communications network. The functions further comprise receiving a security mode command including a key indicator, and determining a second encryption key for enhanced session data security over the channels of the communications network, wherein the second encryption key is determined based on the key indicator and a first key algorithm. The functions further comprise determining a key indicator response and transmitting a security mode complete command including the key indicator response, wherein the key indicator response is constructed to enable determination of the second encryption key based on the key indicator response and a second key algorithm. The apparatus is thereby configured to perform one or more packet data protocol (PDP) context activation processes over at least one of the channels of the communications network, wherein messaging for the PDP context activation processes is encrypted prior to transmission, wherein the encryption of the messaging is based at least in part on the second encryption key. Further, the apparatus is thereby configured to encrypt session data for transmission over the one or more channels of the communications network, wherein the encryption of the session data is based at least in part on the second encryption key.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4C illustrates a diagram of the typical security signaling between a UT and associated GW in a mobile satellite system;

DETAILED DESCRIPTION

An apparatus, method, and software for providing a satellite interface to support mobile communication services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments are discussed with respect to an Internet Protocol (IP)-based architecture, it is recognized by one of ordinary skill in the art that these embodiments have applicability to any type of packet based communications system and equivalent functional capabilities.

Figure 1A:
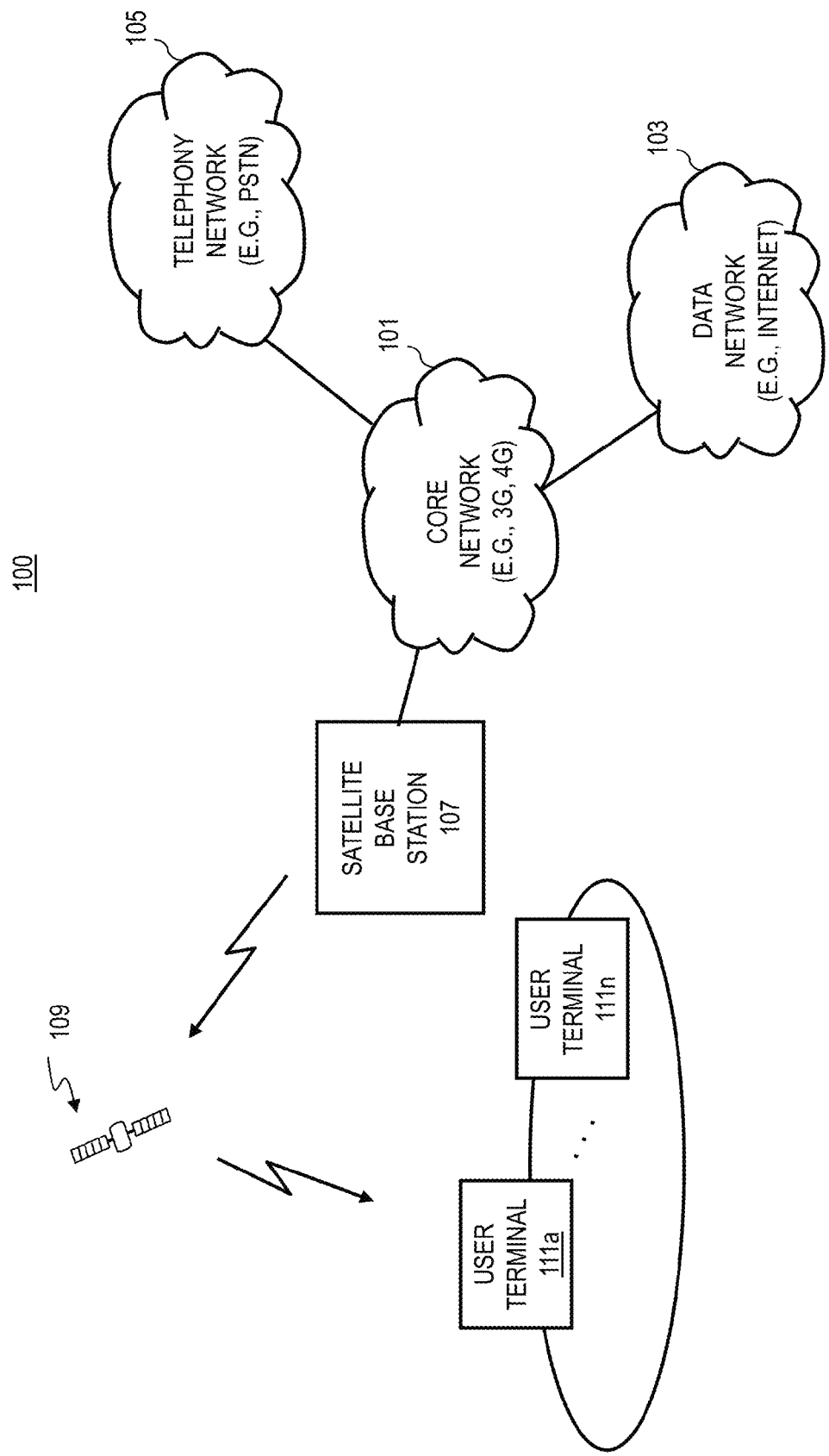
FIGS. 1A and 1B illustrate diagrams of communications systems capable of providing Internet Protocol (IP)-based communication sessions in a mobile satellite communications system.
Figure 1B:
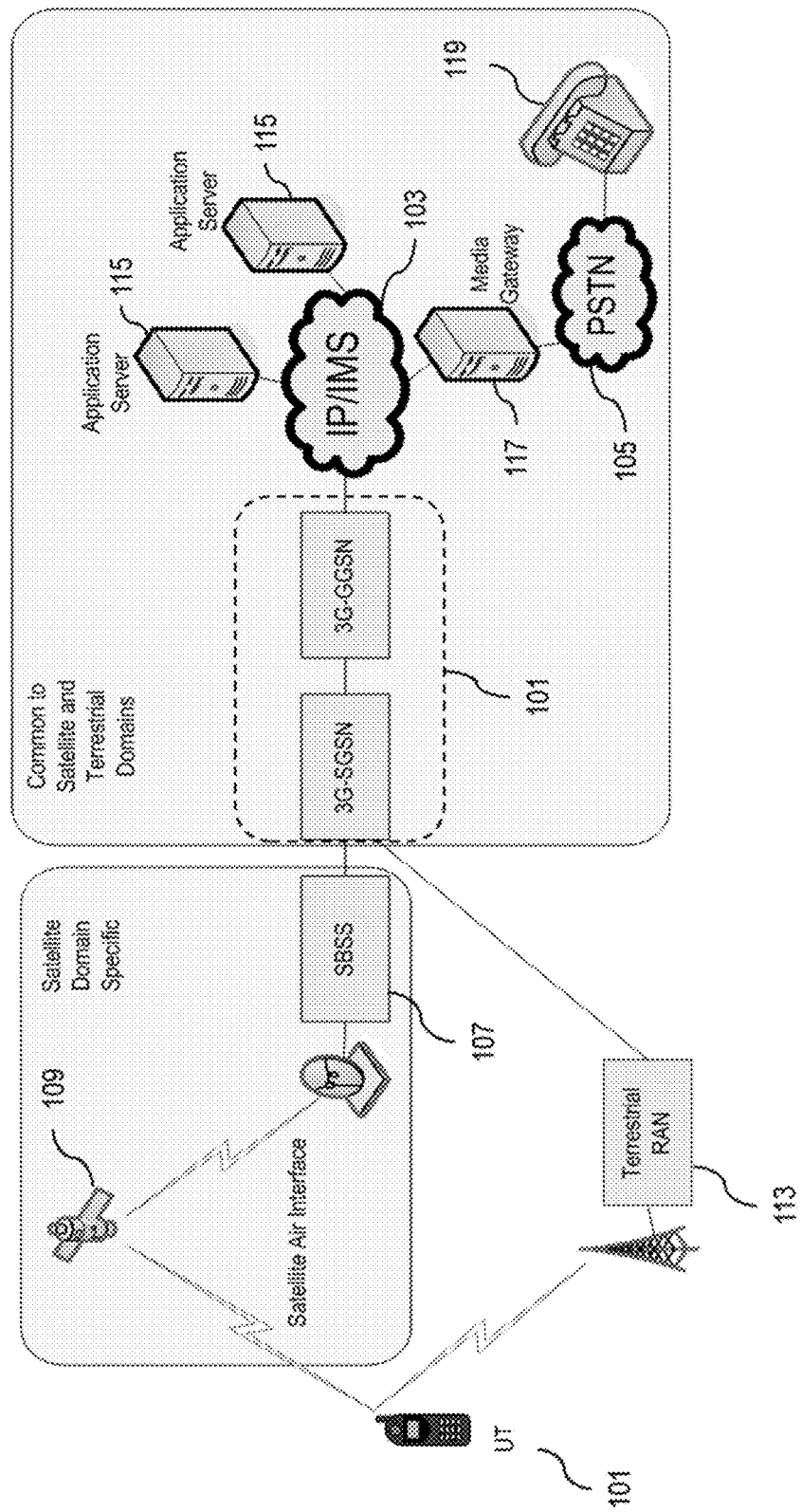

FIGS. 1A and 1B illustrate diagrams of communications systems capable of providing Internet Protocol (IP)-based communication sessions in a mobile satellite communications system. For the purposes of illustration, a system 100 of FIG. 1A supports multimedia services using an Internet Protocol (IP) architecture, such that end-to-end communication sessions are packetized. By way of example, a terrestrial core network 101 is a wireless core network that is compliant with a Third Generation (3G) or Fourth Generation (4G) architecture; e.g., Third Generation Partnership Project (3GPP)-based. For example, the system 100 can utilize a satellite air interface denoted as GMR1-3G and associated protocols, which are fully described in the various standards publications of the European Telecommunications Standards Institute (ETSI) for the GEO—Mobile Radio Interface Specification, numbered as ETSI TS 101 376-(part X)-(sub-part Y) (where the various parts and subparts address different aspects of the air interface and associated protocols—such as the general specifications, radio interface physical layer specifications, radio interface protocol specifications, terminal specifications, etc.). The wireless core network 101 may also have connectivity to a data network 103 and a telephony network 105. Further, the system 100 may employ a security architecture and protocols, such as 3GPP security architectures and protocols—fully specified in the 3GPP standards publications 3GPP TS 24.008 (Mobile Radio Interface Layer 3 Specification; Core Network Protocols; Stage 3), and 3GPP TS 33.102 (3G Security; Security Architecture)—which are incorporated herein by reference in their entireties.

Networks 101, 103, and 105 may be any suitable wireline and/or wireless network. For example, telephony network 105 may include a circuit-switched network, such as the public switched telephone network (PSTN), an integrated services digital network (ISDN), a private branch exchange (PBX), an automotive telematics network, or other like network. Wireless network 101 (e.g., cellular system) may employ various technologies including, for example, code division multiple access (CDMA), enhanced data rates for global evolution (EDGE), general packet radio service (GPRS), global system for mobile communications (GSM), IP multimedia subsystem (IMS), universal mobile telecommunications system (UMTS), etc., as well as any other suitable wireless medium, e.g., microwave access (WiMAX), wireless fidelity (WiFi), satellite, and the like. Moreover, data network 103 may be any local area network (LAN), metropolitan area network (MAN), wide area network (WAN), the Internet, or any other suitable packet-switched network, such as a commercially owned, proprietary packet-switched network having voice over Internet Protocol (VoIP) capabilities, e.g., a proprietary cable or fiber-optic network.

Within the satellite domain, a satellite base station subsystem (SBSS) 107 is introduced that implements the necessary modifications and enhancements for efficient operation over a satellite 109 to one or more user terminals 111a-111n. These terminals 111a-111n can be of various types with different form factors and transmit capabilities; e.g., sleek hand-held terminals, personal digital assistants (PDAs), vehicular terminals, portable terminals, fixed terminals, automotive telematics terminals, etc. The SBSS 107 communicates with the wireless network 101, which includes a core network (e.g., 3G/4G) that is unchanged from terrestrial core network. This consequently permits operators to reuse existing 3G/4G core network elements. The interface between the SBSS 107 and the 3G/4G core network 101 can be a standard terrestrial interface.

It is also noted that the architecture of the system 100 permits the same core network element to simultaneously communicate with a terrestrial base station (not shown) and the SBSS 107. This capability is illustrated in FIG. 1B. As seen, the system 100 enables handover procedures between terrestrial base-station and the SBSS 107 to be executed via a core network with standard procedures defined in terrestrial systems. In this example, the UT 111 has the capability to communicate over a satellite link or directly communicate with a terrestrial radio access network 113 to the wireless network 101. By way of example, the data network 103 is configured as an IP/IMS (IP Multimedia Subsystem) with multiple application servers 115 supplying multimedia content. The data network 103 couples to the PSTN 105 via a media gateway 117; the PSTN 105 can serve one or more voice terminals 119.

In the system 100, a radio access bearer (RAB) is associated with Packet Data Protocol (PDP) context maintained between the user terminal (UT) 111 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT 111 and the S-BSS 107 necessary to satisfy, for example, Quality of Service (QoS) requirements of the SIP call signaling and Voice over IP (VoIP) user plane RABs. The signaling radio bearer supports signaling connectivity between the UT 101 and the satellite radio access network.

While specific reference will be made thereto, it is contemplated that system 100 may embody many forms and include multiple and/or alternative components and facilities.

Figure 2A:
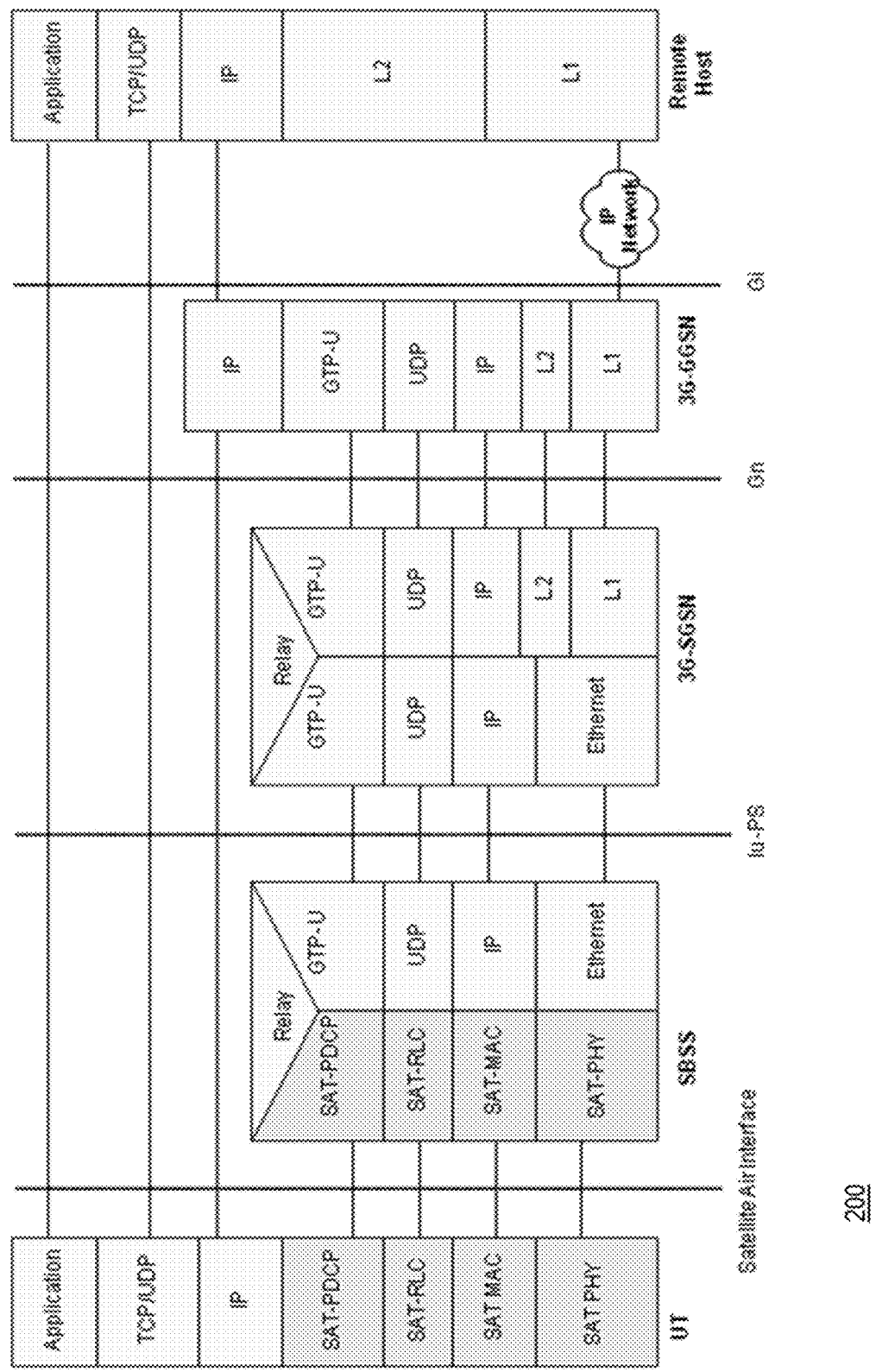
FIGS. 2A and 2B, respectively, illustrate a diagram of a user plane protocol architecture for providing a satellite air interface, and a diagram of a system supporting different core network choices.
Figure 2B:
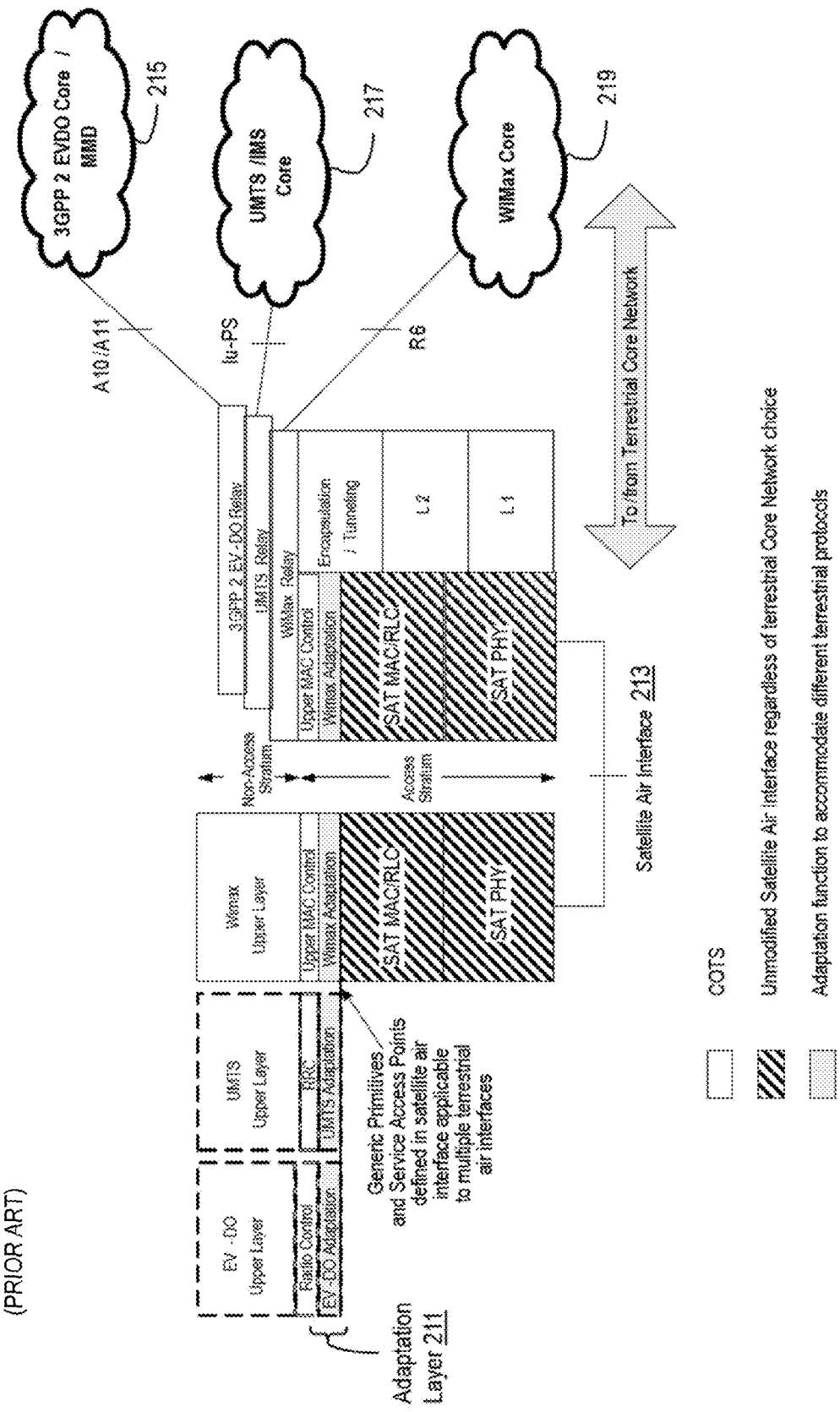

FIGS. 2A and 2B, respectively, illustrate a diagram of a user plane protocol architecture for providing a satellite air interface, and a diagram of a system supporting different core network choices. A user plane protocol architecture 200 employs the following higher protocols at the end terminals (e.g., UT and a remote host): an application layer, a TCP/UDP layer, and an IP layer. The UT 111, according to one embodiment, includes the following satellite domain specific protocols to communicate with the SBSS 107: SAT-PDCP (Packet Data Convergence Protocol), SAT-RLC (Radio Link Control), SAT-MAC (Medium Access Control), and SAT-PHY (Physical). To interface with the terrestrial systems, the SBSS 107 provides the following protocols: GTP-U (GPRS Tunneling Protocol—User Plane), UDP (User Datagram Protocol), IP, and Ethernet. On the terrestrial side, the 3G-SGSN (Serving GPRS Support Node) utilizes GTP-U, UPD, IP, L2, and L1 to communicate with the 3G-GGSN (Gateway GPRS Support Node), which employs an IP layer to link to the remote host. Therefore, in the user plane, PDCP, RLC, MAC and PHY layers are optimized for satellite operation. Next, the control plane is described. As seen in FIG. 2B, a communications system 210 utilizes an adaptation layer 211 to insulate the satellite air interface 213. Consequently, the satellite air interface 213 permits the interoperation with various core networks; e.g., 3GPP2 EVDO (Evolution Data Optimized) core/MMD (Multimedia Domain) network 215, Universal Mobile Telecommunications System/IP Multimedia Subsystem (UMTS/IMS) core network 217, and a WiMax core network 219.

Figure 3:
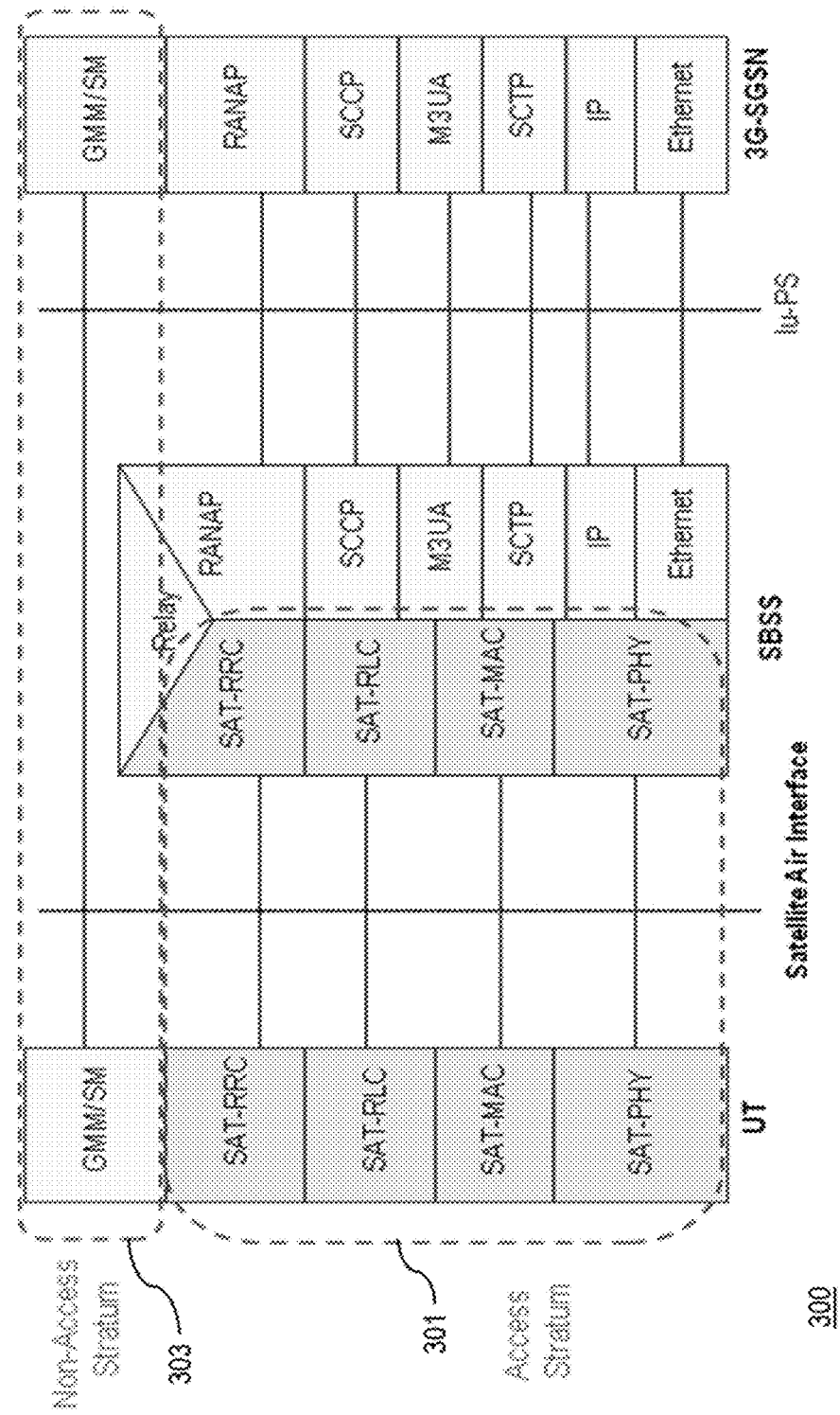
FIG. 3 illustrates a diagram of a control plane protocol architecture for providing a satellite air interface for a mobile satellite system.

FIG. 3 illustrates a diagram of a control plane protocol architecture for providing a satellite air interface in a mobile satellite system. As shown, the SBSS 107 communicates with user terminals (UT) 111 whose radio layer (also called as Access Stratum 301) functionality is consistent with that implemented at the SBSS 107. In this architecture, protocol functions and layers above the Access Stratum 301, also referred to as Non-Access Stratum 303 in the UTs 111 are unchanged. For example, the non-access stratum implements mobility management messaging, session management messaging, etc. Accordingly, these protocols communicate with the core network elements without any modifications to the core network elements. Regardless of what core network elements are chosen by the operator, the satellite-specific access stratum enhancements and modifications between SBSS and UT will remain the same. In the control plane, the RRC, RLC, MAC and PHY layers are optimized for satellite operation.

By way of example, the VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks.

A detailed discussion of SIP and its call control services are described in the documents IETF RFC 2543, IETF RFC 3261 and IETF Internet draft "SIP Call Control Services," Jun. 17, 1999; which are incorporated herein by reference in their entireties. SIP messages are either requests or responses. The user terminal 111 can be a user agent that behaves as either a user agent client (UAC) or a user agent server (UAS), depending on the services that the system 100 is executing. In general, a user agent client issues requests, while a user agent server provides responses to these requests. SIP defines various types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is a BYE request, which indicates to the UAS that the session should be released. In other words, BYE terminates a connection between two users or parties in a conference. The next method is the OPTIONS method; this method solicits information about capabilities and does not assist with establishment of a session. Lastly, the REGISTER provides information about a user's location to a SIP server.

The system 100 may provide delivery of media sessions using an IP-based approach. Specifically, the system may employ a signaling protocol (e.g., SIP) in conjunction with a standard data packet format (e.g., Real-time Transport Protocol (RTP)) to deliver communication services. More specifically, the signaling protocol is used to establish, modify, and terminate a media session, while the standard data packet format serves as the conduit for carrying audio and video over the system 100. Further, to address the issue of costly overhead in support VoIP traffic, an approach may be implemented, whereby, once a VoIP data session is initiated, the overhead for voice traffic is entirely eliminated.

A transmitter (UT 111 or SBSS 107 depending on the direction of information transfer) establishes a VoIP session with a receiver (SBSS 107 or UT 111). To support voice service, the user data stream includes the following: IP multimedia subsystem (IMS) signaling stream, Real-Time Control Protocol (RTCP) stream, and Real-Time Protocol (RTP) speech stream. These streams can be transported over the same bearer (the same Packet Data Protocol (PDP) Context/radio access bearer (RAB)) or over different bearers. To ensure that quality of service (QoS) differentiation can be afforded to the voice media stream relative to that of IMS signaling a separate PDP Context/RAB can be established for IMS signaling. This enables the optimization of bandwidth usage over the satellite link in the system by providing the real-time, low latency guarantees to the voice media stream. For example, session control signaling (e.g., Session Initiation Protocol (SIP)/Session Description Protocol (SDP)) can be utilized over User Datagram Protocol (UDP)/IP for application control between the terminals 111. SIP signaling can be used for multimedia session control.

During the initial setup of the data session (e.g., during activation of the PDP contexts and SIP registration), the transmitter notifies the receiver of the header information corresponding to the VoIP session. Voice payload (media) are carried over RTP/UDP/IP. The coded speech is carried alongside the payload descriptor in the media/RTP payload. Dual Tone Multi-frequency (DTMF) and Silence Insertion Descriptor (SID) packets are also carried alongside the speech packets. Thus, the overhead includes the RTP/UDP/IP header.

The VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks. The SIP exchange necessary to establish a communication session is performed between a VoIP client (in communication with the UT 111) and a SIP server. The VoIP client transmits header information, e.g., RTP/UDP/IP information, to the SBSS 107, which then stores this information. Subsequently, the transmitter need only transmit the voice payload without the header information to the receiver. The receiver, upon receiving the voice payload, regenerates the header for the VoIP packets for further routing to the end user. This process thus completely eliminates the RTP/UDP/IP header at the transmitter and regenerates headers at the receiver. In other words, the transmitting entity informs the receiving entity about the details of the header at the beginning of a VoIP call.

The SBSS 107 provides the association of this header information with the particular VoIP session. The VoIP client generates a voice packet with uncompressed RTP/UDP/IP information. The UT 111 strips this information from the voice packet, leaving only the voice payload to be transmitted to the SBSS 107 over the satellite link. In this manner, overhead information is eliminated from utilizing precious satellite capacity. At the SBSS 107, the RTP/UDP/IP information is retrieved and used to regenerate the entire voice packet for forwarding to the media gateway 117. The media gateway 117 can then terminate the call to the voice station 119 over the PSTN 105. The media gateway 117 generates a voice packet conveying information from the voice station 119; this packet includes uncompressed RTP/UDP/IP information, which the SBSS 107 strips off. The SBSS 107 generates a satellite frame with only the voice payload to transport to the UT 111. At the UT 111, the voice packet is regenerated with the corresponding RTP/UDP/IP information. The physical channel is defined such that a known number of VoIP payloads are carried in each burst. The receiver is able to extract the VoIP payloads at the physical layer and attach a header based on information received at the beginning of the VoIP session.

Accordingly, to provide maximum spectrally efficiency over the satellite interface 313, all packet overhead is removed and only the payload voice frames are transmitted. Any header information used for communications between the vocoders are thus removed prior to transmission on the satellite link and regenerated following reception. The PHY layer provides indications of the channel as well as the transmission content that allows for the indirect communication of information across the satellite link and necessary regeneration of header information. Before entry into the terrestrial network, e.g., core network 101, the header information is put back.

Figure 4A:
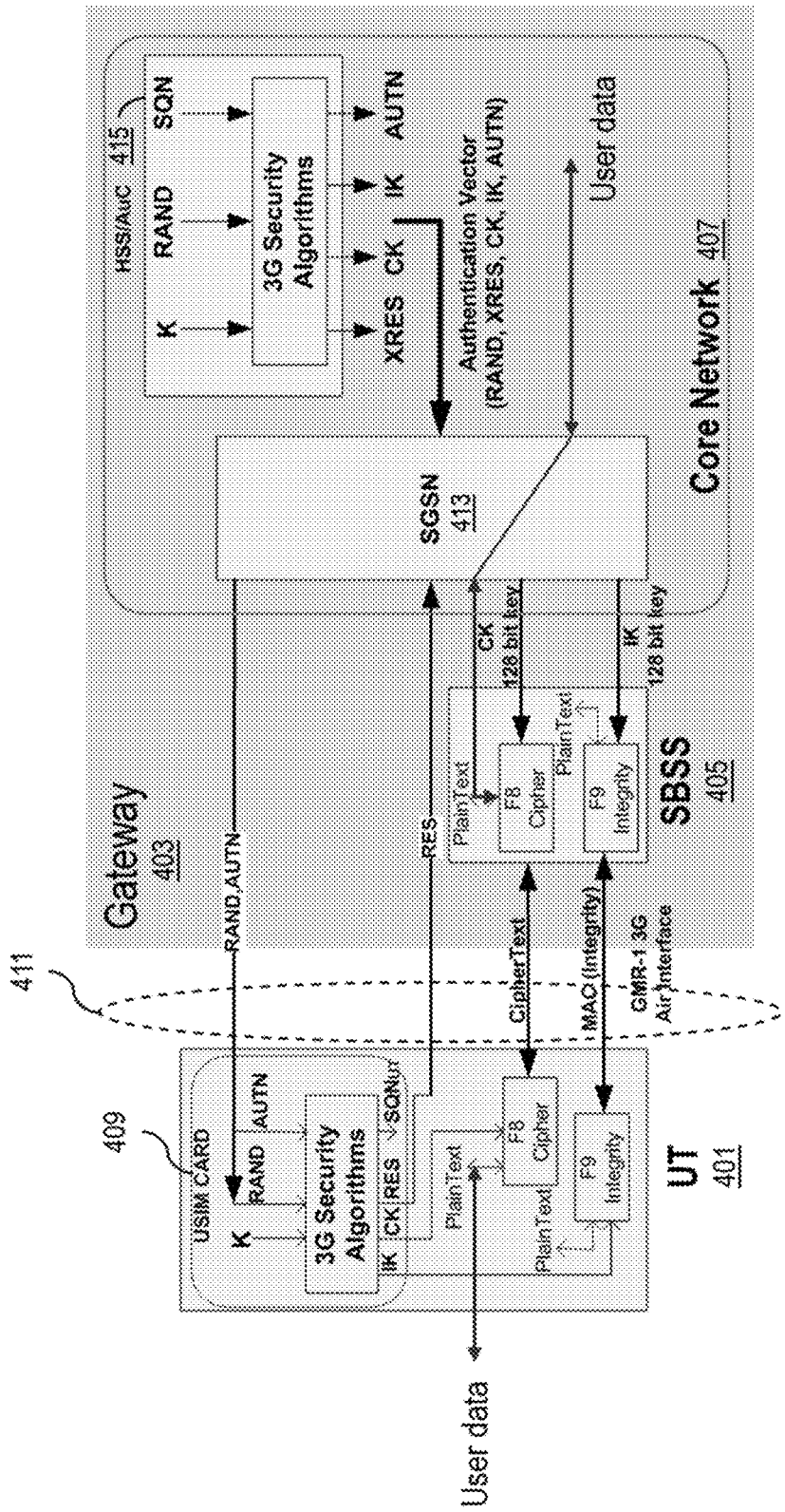
FIG. 4A illustrates a diagram of a typical security architecture of a UT and GW in a mobile satellite system.
Figure 4B:
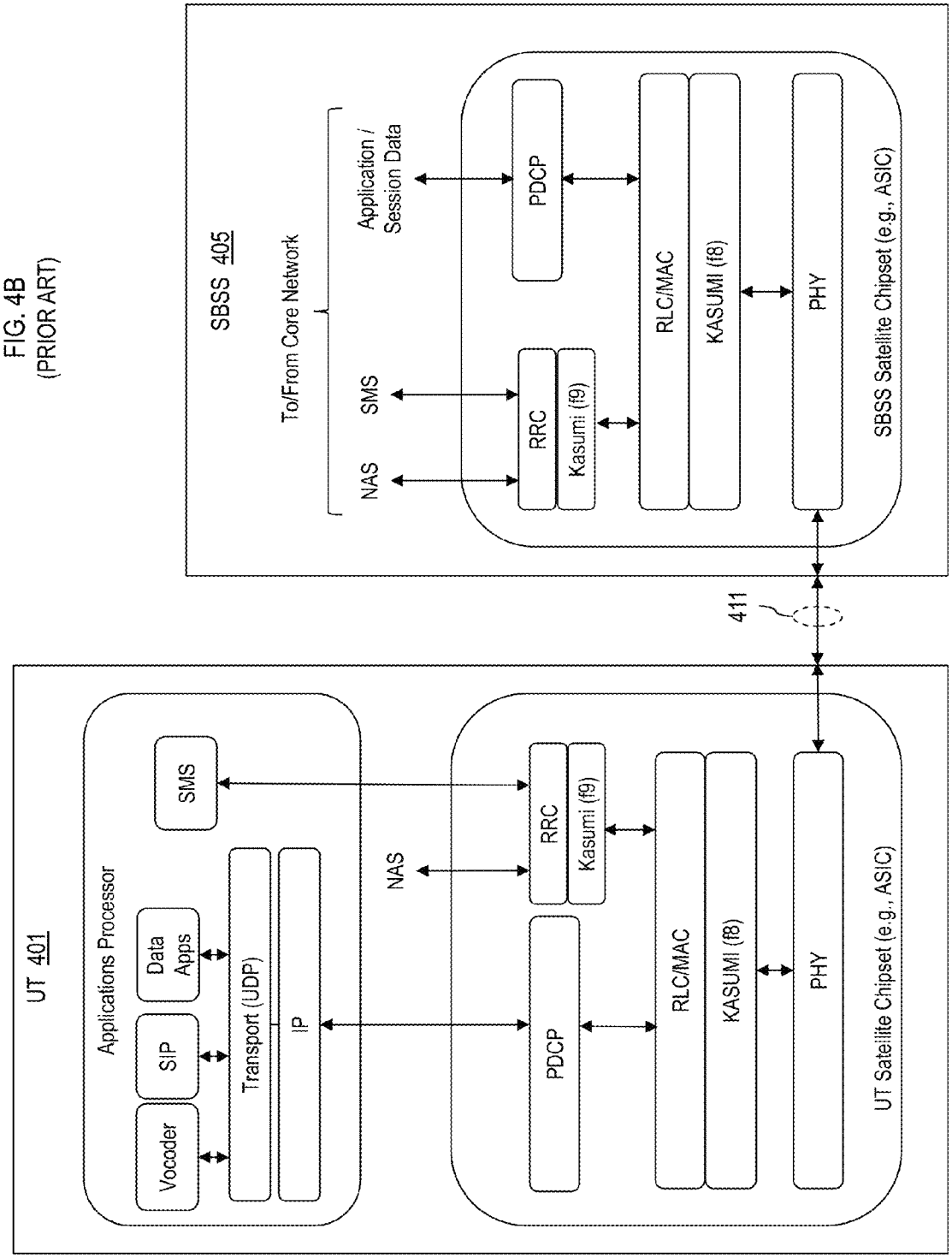
FIG. 4B illustrates a diagram of a typical protocol architecture for UT and SBSS call security processes in a mobile satellite system.

FIG. 4A illustrates a diagram of a typical security architecture of a UT and GW in a mobile satellite system. FIG. 4B illustrates a diagram of a typical protocol architecture for UT and SBSS call security processes in a mobile satellite system. FIG. 4C illustrates a diagram of the typical security signaling between a UT and associated GW in a mobile satellite system. As illustrated in FIG. 4A, the user terminal (UT) 401 communicates with a Gateway (GW) 403 via a satellite channel 411. The GW 403 includes the satellite base station subsystem (SBSS) 405 and the core network (CN) 407, and within the core network the Serving GPRS Support Node (SGSN) 413 and the home subscriber system (authentication control) HSS/AuC 415 are shown. It should be noted that, while the UT, GW, SBSS, and the CN include various other components (e.g., a Gateway GPRS Support Node (GGSN)), the figures illustrate only those components utilized for the present discussions of the security functions and protocols. The UT includes the user terminal security identity module (uSIM) card 409 for UT authentication and data security functions. By way of example, as between a UT and an associated GW, the UT communicates with the GW via the satellite channel 411.

Referring to FIG. 4B, two components of the UT 401 comprise the applications processor and the UT satellite chipset (e.g., an ASIC). The applications processor may include such components and functions as a vocoder, SIP processing, data applications and one or more SMS messaging applications. By way of example, user data (e.g., voice data, in the case of a VoIP call) and session signaling (collectively referred to herein as data) from the vocoder, SIP processing, and data applications flow through transport level processing and Internet protocol (IP) processing. The processed data is then passed on to the UT satellite chipset. Within the chipset, the processed data will pass through a packet data convergence protocol (PDCP) processing layer and an RLC/MAC layer. Within the RLC/MAC layer, a security protocol is applied to the data for security protection while being transmitted over the satellite channel to the GW. For example, in accordance with 3GPP security protocols, KASUMI (f8) encryption protocols are employed for protection of the data. The secured data is then passed on to the physical layer where it will be encoded and modulated for transmission over the satellite channel. SMS data and non-access stratum data is passed on by the applications processor to the UT satellite chipset, wherein it first passes through the radio resource control (RRC) layer. Within the RRC layer, an integrity security protocol is applied to the data. For example, in accordance with 3GPP security protocols, KASUMI (f9) integrity security protocols are employed for authentication of the SMS and NAS messaging data. The integrity protected SMS and NAS data is then passed on through the RLC/MAC and physical layers for transmission over the satellite channel 411.

At the SBSS, the data signals transmitted over the satellite channel are received first at the physical layer of the SBSS satellite chipset, wherein the data signals are demodulated and decoded. The demodulated and decoded data is passed on to the RLC/MAC layer of the SBSS satellite chipset, wherein the data encryption (e.g., the KASUMI (f8) security protocol) is deciphered. The deciphered applications layer messaging data (e.g., VoIP session data) is then passed on to the PDCP layer of the SBSS satellite chipset, and after being processed by that layer is passed on to the core network. The SMS and non-access stratum messaging data is passed on by the RLC/MAC layer to the RRC layer of the SBSS satellite chipset, wherein the integrity protection (e.g., the KASUMI (f9) integrity security protocol) is deciphered to authenticate the messaging and source UT, and after being processed by the RRC layer, the non-access stratum and SMS data is also passed on to the core network.

Referring to FIG. 4C, upon launch of operation (e.g., power on of the UT), the UT and the SGSN perform GPRS registration, authentication and key agreement functions. During the authentication and key agreement functions, the UT and the SGSN establish security keys that will be used for data encryption and integrity security functions (e.g., a ciphering key for data encryption and integrity key for integrity or authentication security protection). These authentication and key agreement functions occur between the uSIM of the UT and the SGSN. At that point, based on the authentication key agreement, the UT computes the respective ciphering key and integrity key. The SGSN then sends a security mode command to the SBSS, and along with that command provides the ciphering key and integrity key to the SBSS. In response, the SBSS sends a security mode command to the UT. The UT responds to the SBSS with a security mode complete command, and the SBSS passes the security mode complete command on to the SGSN. At this point in the process, the security mode between the UT in the GW is active. As indicated in figure, the security mode commands between the SBSS and the UT are integrity protected over the satellite channel based on the KASUMI (f9) integrity or authentication security protocol (using the integrity key). The UT and the SBSS thereby each knows that it is communicating with a trusted entity.

After the security mode is activated, the primary and secondary PDP contexts are activated, and SIP registration is completed. From there, a data application on the UT can be activated and the associated data session may proceed (e.g., the user can dial a phone number and initiate a call from the UT, over the satellite channel, to the GW for communication with a dialed terminal). As further indicated in the figure, from the point of completion of the security mode signaling and the activation of the security protocol (e.g., KASUMI (f9)), all RRC layer messages (e.g., SMS and non-access stratum messages) continue to be protected based on the integrity protection, and all data (e.g., applications data, such as VoIP session data) will be protected based on the applied security encryption protocols (e.g., KASUMI (f8)). By way of example, in accordance with 3GPP security protocols, the KASUMI (f8) protocol comprises an advanced encryption standard (AES) encryption based on a 128 bit ciphering key.

Figure 5:
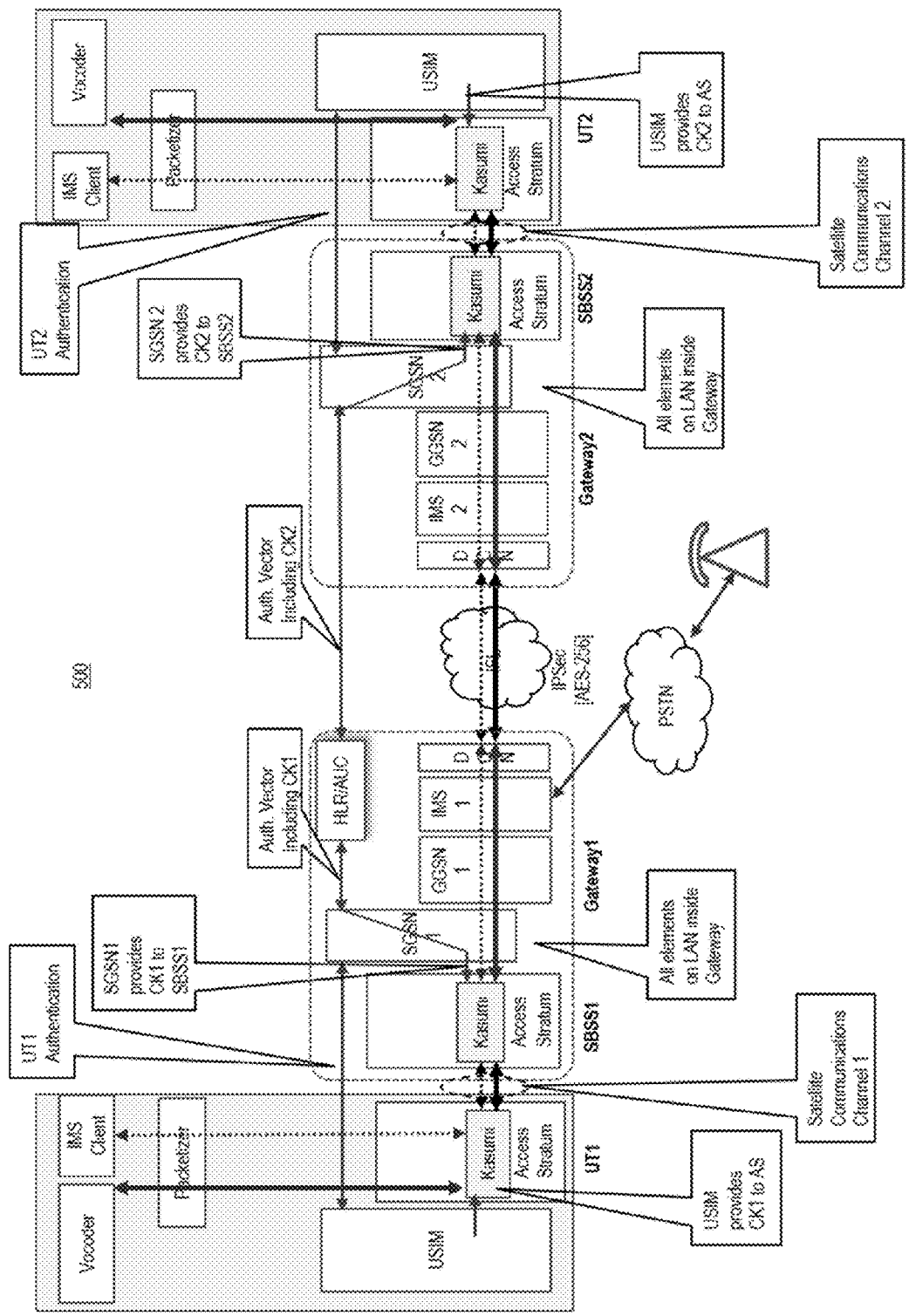
FIG. 5 illustrates a diagram of a typical user terminal to user terminal call within a mobile satellite system.

FIG. 5 illustrates a diagram of a typical user terminal to user terminal call (e.g., in accordance with 3GPP security protocols) within a mobile satellite system.

Figure 6A:
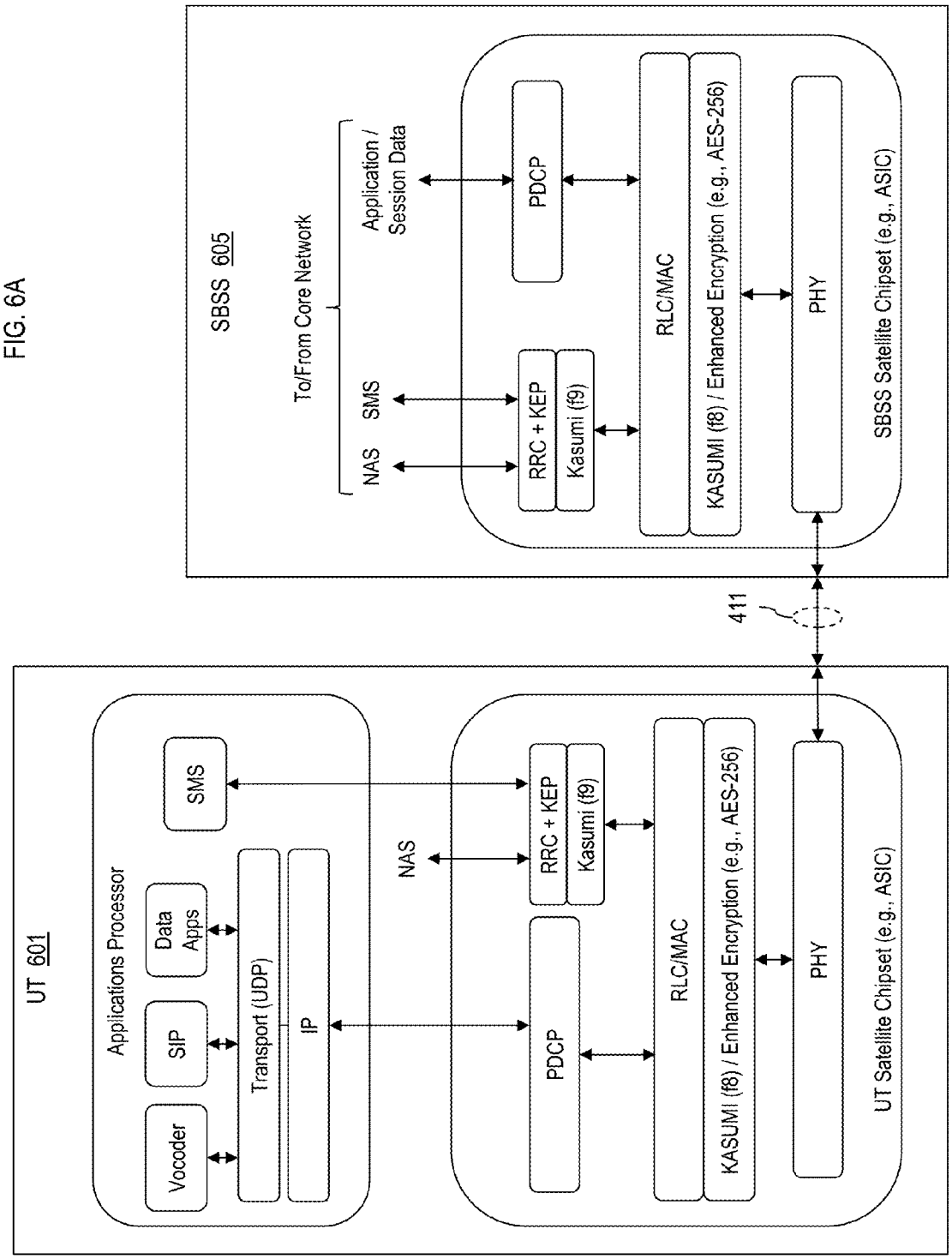
FIG. 6A illustrates a diagram of a protocol architecture for UT and SBSS call security processes in a mobile satellite system, which employs a key exchange protocol in the radio resource control (RRC) layer of the satellite chipsets, in accordance with example embodiments.
Figure 6B:
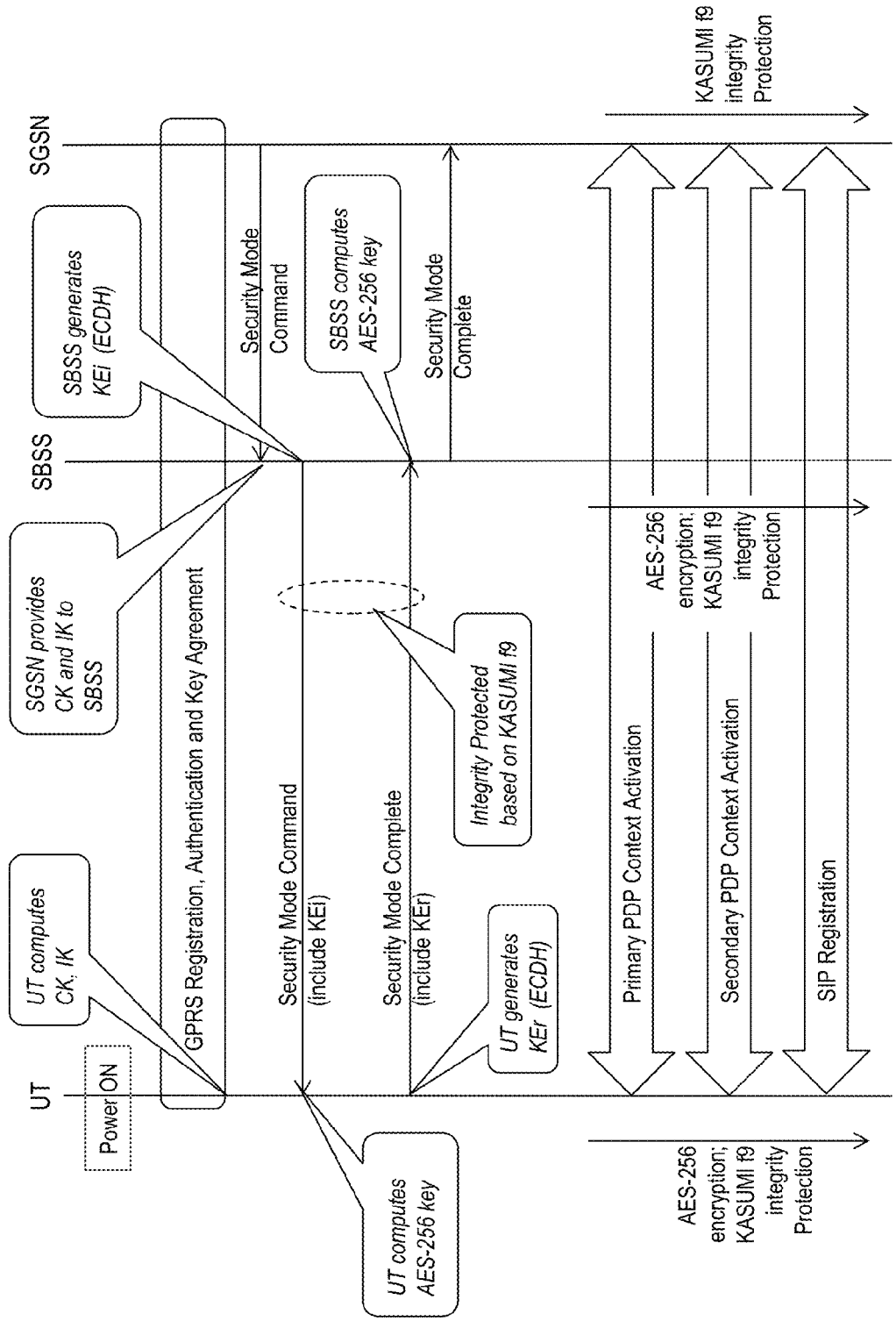
FIG. 6B illustrates a diagram of the security signaling between a UT and associated GW in a mobile satellite system, based on the key exchange protocol employed in the radio resource control (RRC) layer of the satellite chipsets, in accordance with example embodiments.

FIG. 6A illustrates a diagram of a protocol architecture for UT and SBSS call security processes in a mobile satellite system, which employs a key exchange protocol in the radio resource control (RRC) layer of the satellite chipsets, in accordance with example embodiments of the present invention. FIG. 6B illustrates a diagram of the security signaling between a UT and associated GW in a mobile satellite system, based on the key exchange protocol employed in the radio resource control (RRC) layer of the satellite chipsets, in accordance with example embodiments of the present invention.

Referring to FIGS. 6A and 6B, much of the architecture and protocols of the UT 601 and the SBSS 605 mirrors that of the UT 401 and SBSS 405 (described with reference to FIGS. 4B and 4C). In order to implement an enhanced encryption in current mobile satellite communications systems, with minimal impact on existing user terminal designs and architectures (e.g., existing SIM card designs and associated security protocols) and existing infrastructure designs and architectures (e.g., existing core network components), the enhanced encryption functionalities are implemented between satellite chipset in the UT in the satellite chipset in the SBSS (operating on the access stratum level). Accordingly, the SIM-based registration, authentication and key agreement processes between the UT and the SGSN remain unchanged. Instead, a key exchange protocol (KEP) is employed between the UT 601 and the SBSS 605. The KEP facilitates the establishment of one or more ciphering keys that will be employed for data encryption between the UT and SBSS. Then, in the RLC/MAC layer, an enhanced encryption protocol (e.g., Advanced Encryption Standard 256) is employed for the encryption of the data transmitted over the satellite channel between the UT and the SBSS. The enhanced encryption protocol, for example, is based on the key(s) resulting from the key exchange protocol. According to one example, the KEP may be based on an Elliptic Curve Diffie-Hellman (ECDH) key exchange between the UT and the SBSS (e.g., as described in Internet Engineering Task Force (IETF), Request for Comment (RFQ) No. 5903, titled "Elliptic Curve Groups modulo a Prime (ECP Groups) for IKE and IKEv2," June 2010).

Referring to FIG. 6B, as was previously described with respect to FIG. 4C, upon launch of operation (e.g., power on of the UT), the UT and the SGSN perform GPRS registration, authentication and key agreement functions. Then, also as with FIG. 4C, based on the authentication key agreement, the UT computes the ciphering key and integrity key, and the SGSN sends the security mode command to the SBSS providing the ciphering and integrity keys. Once the SBSS receives the security mode command from the SGSN, the SBSS generates a security mode command, including an encryption key seed and provides the security mode command and the key seed to the UT. The key seed, however, does not comprise the actual session key that will be used for data encryption during the respective communication session, but rather comprises a key initiator based on which the actual session key can be generated by the UT. Then, based on the received key seed, and an algorithm known only to the UT, the UT generates an enhanced encryption key (e.g., an AES-256 key) for encryption and decryption of the actual session data transmitted and received over the satellite channel. For example, in accordance with the ECDH key protocol, the key seed may comprise an encryption key initiator (KEi).

Based on the key seed, the UT generates, a key response value and a security mode complete command, and passes the security mode complete command, including the key response value, back to the SBSS. Then, based on the received key response value, and an algorithm known only to the SBSS, the SBSS is able to generate the same enhanced encryption key to enable the encryption and decryption of the session data transmitted and received over the satellite channel. For example, in accordance with the ECDH key protocol, the key response value may comprise an encryption key responder value (KEr). The SBSS also provides a security mode complete command back to the SGSN. The security mode complete command, passed on to the SGSN, however, excludes the key response value, and thus appears to the SGSN as a typical security mode complete command.

Now, as again indicated in figure, the security mode commands between the SBSS and the UT are integrity protected over the satellite channel (e.g., based on the KASUMI (f9) integrity security protocol using the integrity key), and the UT and SBSS each knows that it is communicating with a trusted entity. As further indicated, from the point of completion of the security mode signaling and the activation of the security processing, all subsequent RRC messages are similarly integrity protected (e.g., all SMS and non-access stratum messages) based on the integrity security protocol. With respect to communications session data (e.g., applications data, such as VoIP session data), however, based on the enhanced session keys between the UT and SBSS, the subsequent session data transmitted between the UT and SBSS (and also the messaging for the activation of the primary and secondary PDP contexts and for SIP registration signaling) will be protected over the satellite channel 411 according to the enhanced encryption protocol (e.g., according to AES-256 encryption protocols).

According to a further example embodiment, for an even further enhanced security protocol, the SBSS may be configured to change the enhanced encryption key based on a periodic interval. The interval between key changes, for example, may be a configurable parameter of the SBSS under operator control or may be a predetermined preprogrammed value based on application types. By way of example, the SBSS may be configured with a programmable key timer, and once a programmed key-life interval expires, the SBSS would initiate a new security mode command, with a new security key seed or key initiator (KEi). The UT would then compute a new enhanced security key (e.g., a new AES-256 key), and would also provide a new key response value or encryption key responder (KEr) to the SBSS. Based on the response value, the SBSS could then compute the new key. Alternatively, the key time-out interval and key change process could be controlled by the SGSN, and initiated via a new security mode command provided by the SGSN. Under this key time-out method, however, the key life interval and change process is controlled by the gateway, and is not a UT or application-based function—e.g., the key life interval is not controlled based on a particular UT (e.g., UT type) or a particular application session of a UT.

According to example embodiments, therefore, the present invention provides system architectures and protocols for enhanced data integrity and security in typical mobile satellite communications systems, such as systems designed for operation in accordance with the ETSI GMR1-3G GEO—Mobile Radio Interface Specifications. For example, the provided architectures and protocols facilitate enhanced data security for communications session data transmitted over the satellite links of such systems, without requiring any modifications to current core network and uSIM-based UT architectures and protocols. Further, the provided architectures and protocols provides for such enhanced data security by leveraging the RRC layer messaging of the current protocols, and thus avoid burdening the system with additional over-the-air messaging (which otherwise would result in added session initiation delay an utilization of additional bandwidth resources). Additionally, the provided architectures and protocols take advantage of existing data integrity security protocols for protection of the key exchange protocol messaging included with the baseline RRC messaging.

Figure 7A:
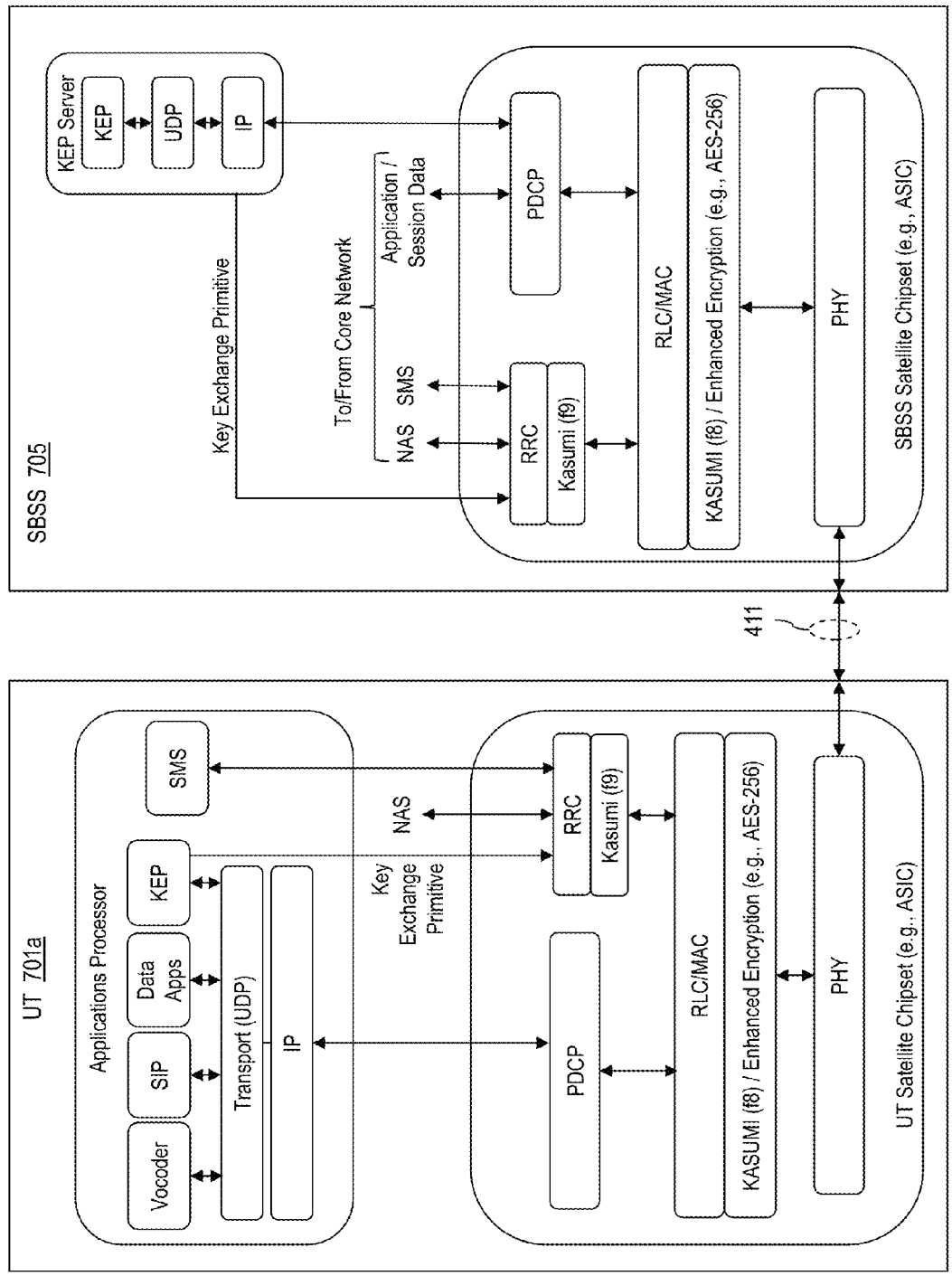
FIG. 7A illustrates a diagram of a protocol architecture for UT and SBSS call security processes in a mobile satellite system, which employs a key exchange protocol in the applications processor layer of the UT, in accordance with example embodiments.
Figure 7B:
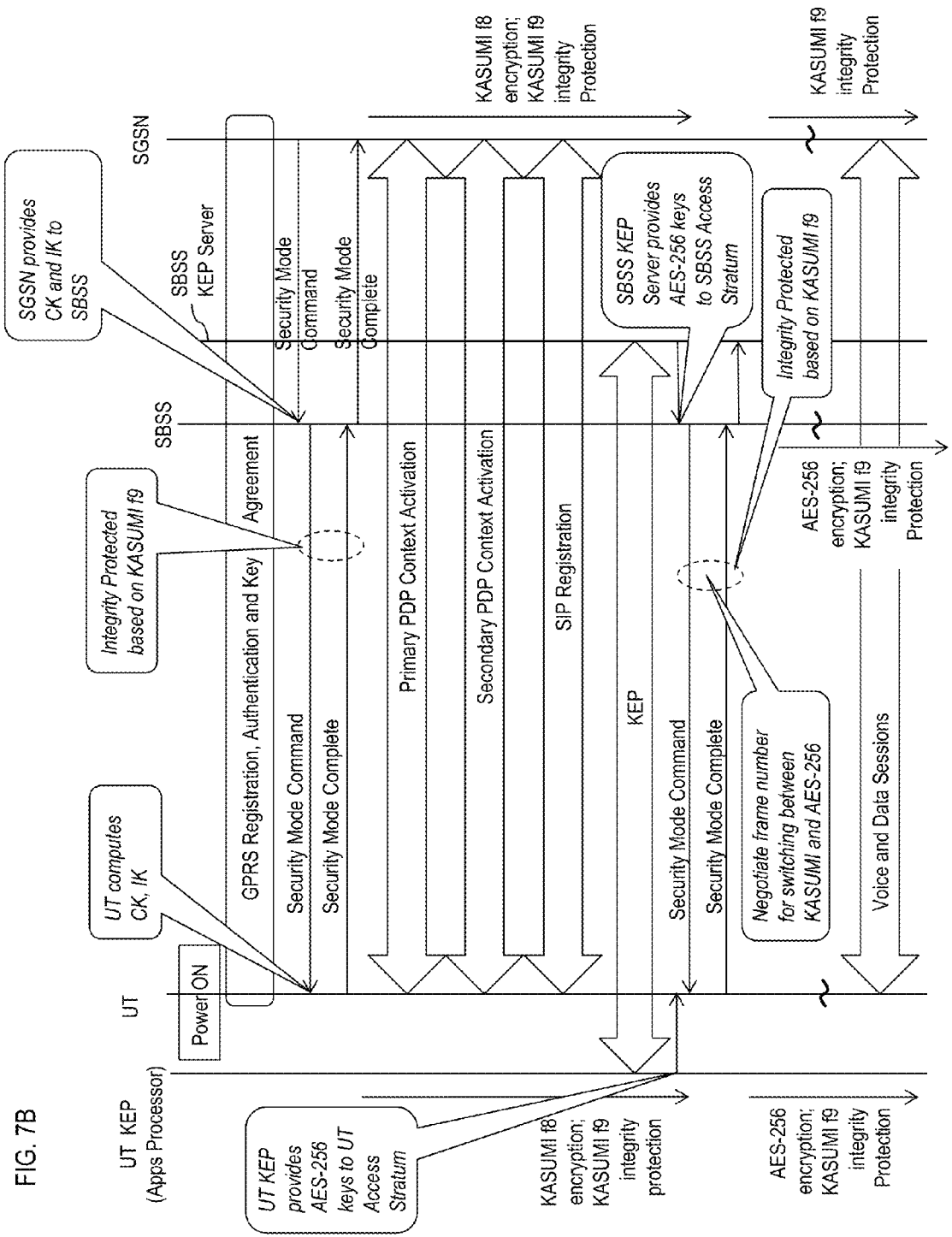
FIG. 7B illustrates a diagram of the security signaling between a UT and associated GW in a mobile satellite system, based on the key exchange protocol employed in the applications processor layer of the UT, in accordance with example embodiments.
Figure 7C:
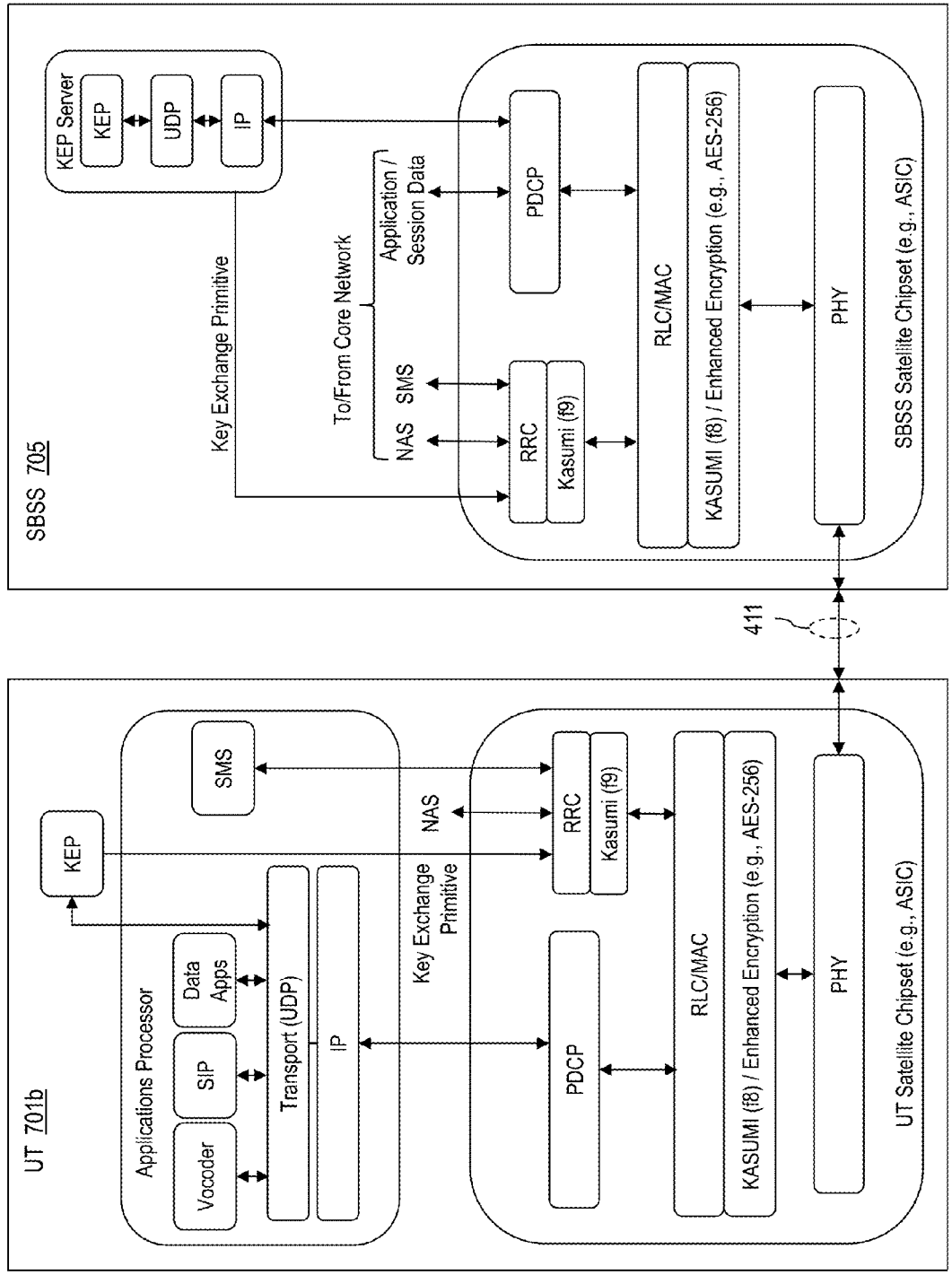
FIG. 7C illustrates a diagram of a further protocol architecture for UT and SBSS call security processes in a mobile satellite system, which employs a key exchange protocol external to both the applications processor and satellite chipset layers of the UT, in accordance with example embodiments.

FIG. 7A illustrates a diagram of a protocol architecture for UT and SBSS call security processes in a 3G mobile satellite system, which employs a key exchange protocol in the applications processor layer of the UT, in accordance with example embodiments. FIG. 7B illustrates a diagram of the security signaling between a UT and associated GW in a mobile satellite system, based on the key exchange protocol employed in the applications processor layer of the UT, in accordance with example embodiments of the present invention. FIG. 7C illustrates a diagram of a further protocol architecture for UT and SBSS call security processes in a mobile satellite system, which employs a key exchange protocol external to both the applications processor and satellite chipset layers of the UT, in accordance with example embodiments of the present invention.

Referring to FIGS. 7A and 7B, as with prior described embodiments, the enhanced encryption according to the present embodiment is implemented in a manner with minimal impact on existing user terminal designs and architectures and existing infrastructure designs and architectures. In that regard, the key exchange protocol (KEP) and enhanced encryption functions are also implemented between the UT and the SBSS for protection of the data transmissions over the satellite. Accordingly, again much of the architecture and functionality of the UT 701a and the SBSS 705 mirrors that of the UT 401 and the SBSS 405 (described with reference to FIGS. 4A and 4B). For example, the SIM-based registration, authentication and key agreement processes between the UT and the SGSN remain unchanged. According to the present embodiment, however, the KEP is implemented in the applications processor layer of the UT and in a KEP server of the SBSS. By way of example, the KEP messaging for establishment of the data session enhanced encryption keys is executed between the applications processor of the UT and the KEP server of the SBSS via the standard data transport path of the UT and SBSS (e.g., on the UT side, the UDP and IP layers of the applications processor, the PDCP, RLC/MAC/KASUMI (f8) and physical layers of the satellite chipset, and on the SBSS side, the PDCP, RLC/MAC/KASUMI (f8) and physical layers of the satellite chipset, and the UDP and IP layers of the KEP server). By way of further example, however, the actual session keys for the enhanced data encryption may be passed by the KEP process of the UT applications processor directly to the RLC/MAC layer of the UT satellite chipset, and may be passed by the KEP server of the SBSS directly to the RLC/MAC layer of the SBSS satellite chipset (e.g., via respective key exchange primitives). The KEP facilitates the establishment the ciphering keys that will be employed for data encryption between the UT and SBSS. Then, in the RLC/MAC layer, the enhanced encryption protocol (e.g., Advanced Encryption Standard 256), based on the keys resulting from the KEP, is employed for the encryption of the data transmitted over the satellite channel 411 between the UT and the SBSS.

Referring to FIG. 7B, as was previously described with respect to FIG. 4C, upon launch of operation (e.g., power on of the UT), the UT and the SGSN perform GPRS registration, authentication and key agreement functions. Then, based on the authentication key agreement, the security mode commands between the SGSN, SBSS and UT are performed as described with respect to FIG. 4C. The UT computes the ciphering key and integrity key, and the SGSN sends a security mode command to the SBSS providing the ciphering and integrity keys. Once the SBSS receives the security mode command from the SGSN, the SBSS generates a security mode command, and sends the command to the UT. The UT generates a security mode complete command, and passes the security mode complete command back to the SBSS. The SBSS then provides a security mode complete command back to the SGSN, and from there the security mode is activated. As can be seen thus far, in this embodiment, the activated security mode provides protection based on legacy encryption and integrity protocols (e.g., the KASUMI (f8) and (f9) protocols), and all SMS and NAS messaging is protected based on the applied legacy integrity security protocols and all session/applications data messaging is protected based on the applied legacy encryption security protocols. After the security mode is activated, the primary and secondary PDP contexts are activated, and SIP registration is completed.

At this point, in order to establish the session keys to support enhanced encryption protocols for session data protection over the satellite channel, the key exchange protocol (KEP) is executed between the KEP function of the UT applications processor and the KEP function of the SBSS key exchange protocol server. By way of example, the KEP between the UT applications processor and the SBSS KEP server may be implemented based on a key exchange protocol, such as the Internet Key Exchange Protocol Version 2 (IKEv2), as described in the Internet Engineering Task Force (IETF) Request for Comment (RFQ) No. 5996, September 2010. As a result of the KEP process, the KEP function of the UT applications processor and the KEP function of the SBSS key exchange protocol server have negotiated agreed upon encryption keys for the application of enhanced security encryption protocols with respect to subsequent application and communications data session messaging (e.g., one or more AES-256 session keys). With this embodiment, in view of the previously activated security mode, the KEP messaging is protected over the satellite channel 411 between the UT and the SBSS, based on the applied encryption security protocol (e.g., the KASUMI (f8) protocol). Whereas, in the prior embodiments, the key exchange protocol messaging was transmitted over the satellite channel in an unencrypted format.

Once the KEP procedure has been completed, the KEP process of the UT applications processor provides the resulting session keys to the UT satellite chipset, and the KEP server of the SBSS provides the session keys to the SBSS satellite chipset (e.g., via respective key primitives delivered to the respective RRC layers of the UT and SBSS satellite chipsets). The UT in the SBSS then exchange security mode command and security mode complete messages, activating the security mode covering subsequent messaging transmitted over the satellite channel 411. As part of the security mode command and security mode complete messaging, the UT in the SBSS negotiate and establish a reference to a specific data transport frame where the application of the enhanced encryption protocols (based on the agreed session keys) will begin. The frame reference marks the point in time within the respective data session where the data encryption will switch from the KASUMI (f8) encryption protocol to the enhanced encryption protocols based on the session keys. From this point, all subsequent RRC messages are integrity protected (e.g., all SMS and non-access stratum messages) based on the integrity security protocol (e.g., the KASUMI (f9) protocol), and, based on the enhanced session keys between the UT and SBSS, all communications session data (e.g., data messaging of subsequent voice and data sessions, such as VoIP session data) transmitted between the UT and SBSS will be protected over the satellite channel 411 according to the enhanced encryption protocol (e.g., AES-256 security protocols).

With reference to FIG. 7C, according to a further embodiment, the key exchange process (KEP) of the UT 701b may alternatively be implemented in a separate process module (e.g., an FPGA) within the UT, but exterior to both the applications processor and the satellite chipset of the UT. Such an embodiment facilitates enhanced security by removing the key exchange protocol process design from within the domain of the applications processor, and placing it within the domain of an individually designed component, thus facilitating and enhanced control over the secrecy of the key exchange protocol processes for a system designer, owner or operator. For this embodiment, all protocol interfaces and signaling remain as described with respect to FIGS. 7A and 7B, above, except that the KEP process messaging occurs between the external KEP module and the transport/IP layers of the applications processor may occur via an external interface to the applications processor. Further, in this embodiment, the provision of the session keys via the key exchange primitive will occur via different mechanism then the embodiment of FIGS. 7A and 7B. For example, according to one alternative, the key exchange primitive baby past to the RRC layer of the UT satellite chipset via a pass-through interface through the applications processor. Alternatively, the UT satellite chipset can be configured with an external interface for receipt of the key exchange primitive directly from the external KEP module (excluding any involvement of the applications processor)— which alternative is not shown in FIG. 7C.

Further, with respect to the applications processor-based key exchange protocol embodiments of FIGS. 7A, 7B and 7C, a periodic modification of the session key can be initiated by the user terminal. With further reference to FIG. 7B, upon the session key timeout, the user terminal can achieve a key change by initiating a new key exchange protocol process. Upon the initiation of a new key exchange protocol process, the UT and the SBSS execute the process and thereby establish a new session key. The key exchange protocol process of the UT passes the new key on to the RRC layer of the UT T satellite chipset in the SBSS KEP server passes the new key on to the SBSS satellite chipset. The UT and SBSS satellite chipsets then complete a new security mode command and security mode complete message exchange sequence, during which they establish a frame reference number for the data frame with respect to which the new key will begin to be used for encryption of the session data.

Figure 8A:
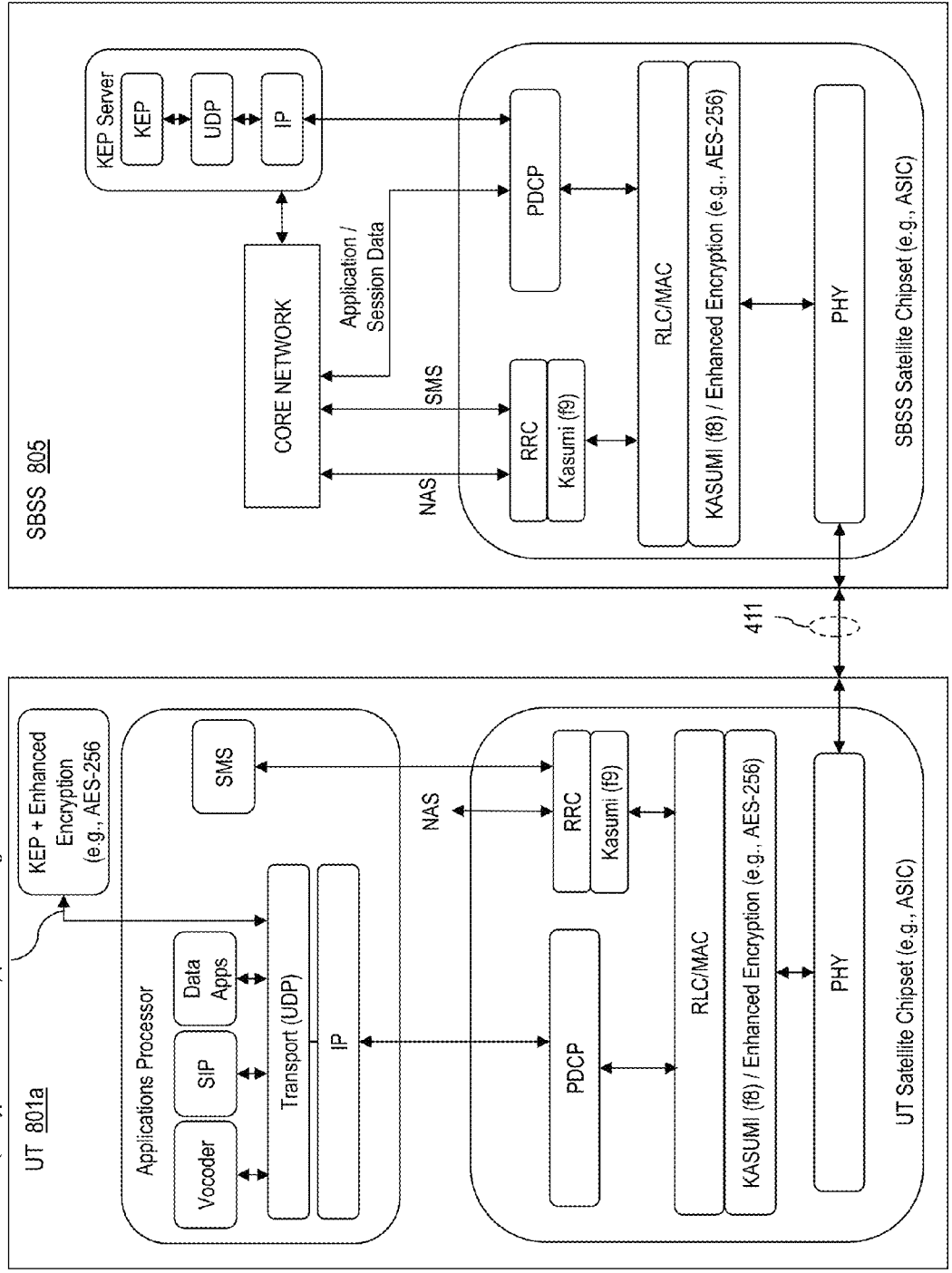
FIGS. 8A and 8B illustrate diagrams of further protocol architectures for UT and SBSS call security processes in a mobile satellite system, which employ a key exchange protocol and associated enhanced encryption protocols in the applications processor layer of the UT, in accordance with example embodiments.
Figure 8B:
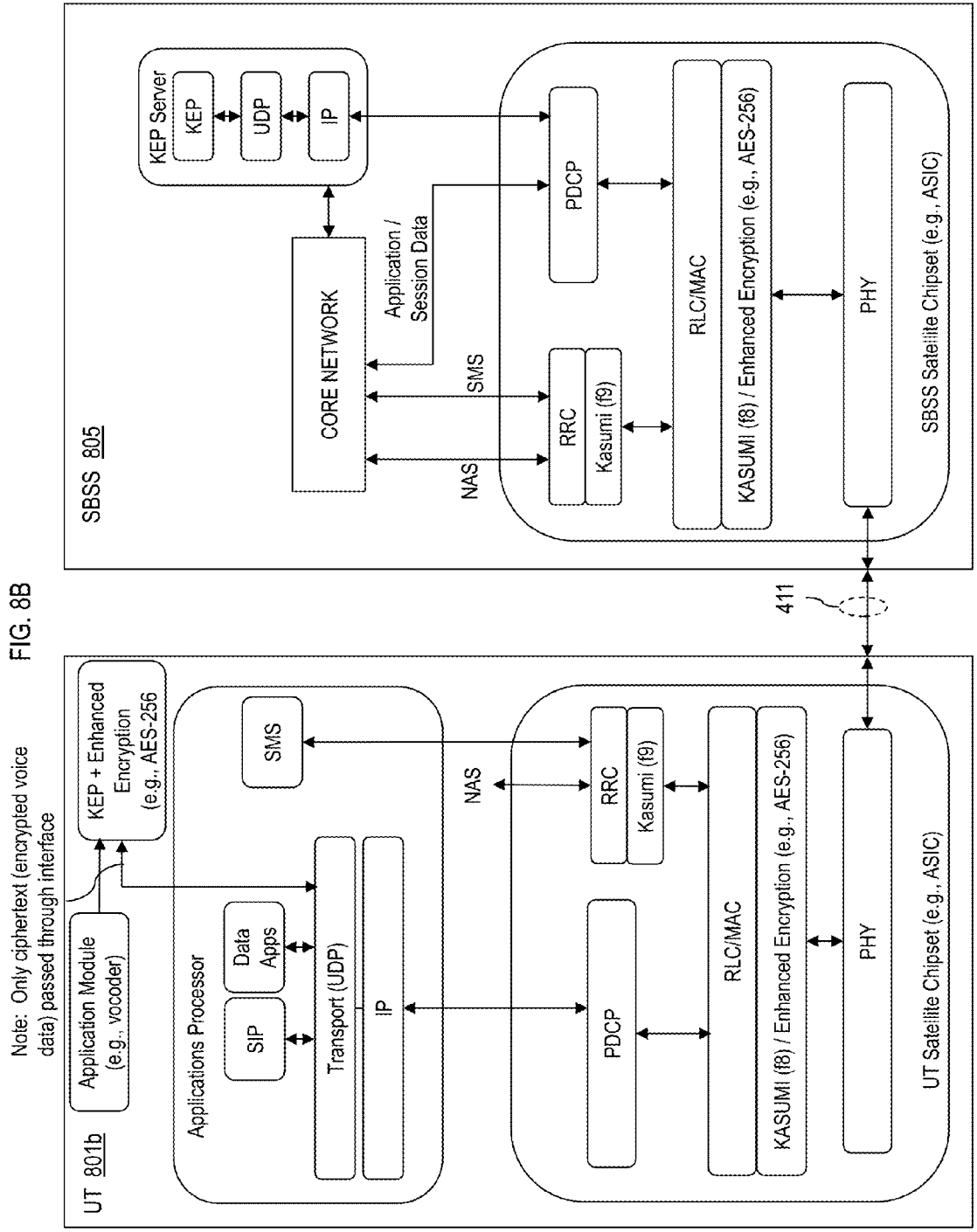

FIGS. 8A and 8B illustrate diagrams of further protocol architectures for UT and SBSS call security processes in a mobile satellite system, which employ a key exchange protocol and associated enhanced encryption protocols in the applications processor layer of the UT, in accordance with example embodiments of the present invention. With reference to FIG. 8A, UT 801a includes key exchange protocol and enhanced encryption module exterior to both the applications processor and satellite chipset of the UT. As illustrated here, the KEP+enhanced encryption module interfaces with the transport/IP layers of the applications processor applications processor via a plaintext and ciphertext interface. Accordingly, during an application data session (e.g., of VoIP session), the application data (e.g., the voice data from the vocoder) is passed via the UDP layer of the applications processor to the KEP+enhanced encryption module. The KEP+enhanced encryption module applies the enhanced encryption to the application data and passes the encrypted data (e.g., the ciphertext) back to the UDP layer of the applications processor. The key exchange protocol process between the UT and the KEP server of the SBSS occurs, as with the embodiments of FIG. 8C, between the KEP+enhanced encryption module of the UT and the KEP server of the SBSS via the standard data transport paths between the UT in the SBSS. According to the embodiments of FIGS. 8A and 8B, where the enhanced encryption and decryption protocols are employed by an applications module in the applications layer of the UT, the encryption and decryption is handled at either end of the transmission within the UT, and thus neither the SBSS with the core network of the Gateway is involved.

Alternatively, with reference to FIG. 8B, an application module (e.g., in the case of a VoIP application, the vocoder) may also be implemented exterior to the applications processor within the UT. According to this embodiment, the session data from the application module (e.g., the voice data of the VoIP session) would be passed directly to the KEP+enhanced encryption module, without involvement of the applications processor. The KEP+enhanced encryption module then applies the enhanced encryption to the application data to generate the encrypted data (e.g., the ciphertext). Further, as is illustrated here, only the encrypted data is passed to the transport/IP layers via the external interface of the applications processor.

Figures 9A, 9B:
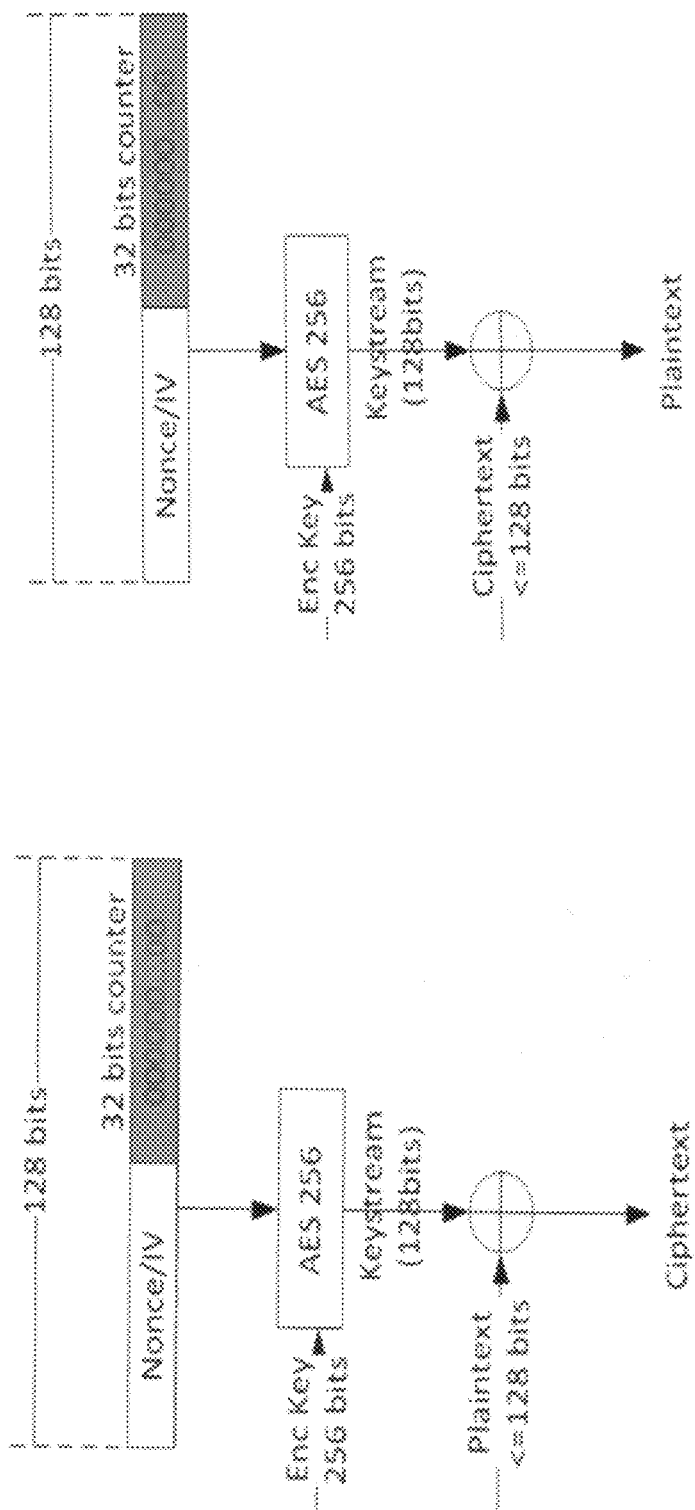
FIGS. 9A and 9B, respectively illustrate the counter mode protocols for the encryptor and decryptor for standard AES-256 encryption.

FIGS. 9A and 9B, respectively illustrate the counter mode protocols for the encryptor and decryptor for standard AES-256 encryption. The generic advanced encryption standard (AES) is a block mode ciphering that always works on 128 bits of plaintext to generate 128 bits of encrypted data or ciphertext. The AES counter mode operates as a stream mode, generating the ciphertext by exclusive-oring (XOR-ing) it key stream (output by the AES engine) and the plaintext. The plaintext can be in blocks of less than the key stream size (e.g., 128 bits), in which case the ciphertext is truncated at the endpoint of the plaintext data (the ciphertext output from the process is the same length as the plaintext input to the process). If the plaintext is of a block size larger than 128 bits, then the next 128 bits will be XORed with the next key stream, and so on. Further, with AES encryption, rather than simply encrypt the source session data based only on the encryption key, an additional data sequence (e.g., a 128 bit data sequence) is employed to further enhance the strength of the encryption. The additional 128 bit data sequence changes from frame to frame so that an equivalent piece of source data, encrypted based on the encryption key, will not result in an identical encrypted output, which makes it more difficult for unintended interceptors to detect patterns in the encrypted data.

With reference to FIGS. 9A and 9B, the additional 128 bit data sequence comprises a 96 bit static data sequence (including an initiation vector), also referred to as a Nonce (number used once), and a 32 bit dynamic data sequence (e.g., a counter). The initiation vector reflects a static input value to the encryption process, while the 32 bit counter is a transient value the changes with every data block being encrypted. The 32 bit counter starts with a zero value at the start or activation of the data encryption function. Then, for the first data block or packet to be encrypted, the 128 bit data sequence (consisting of the initiation vector and 32 bit counter value of zero) is fed into the AES-256 engine along with the 256 bit encryption key. The output of the AES-256 engine consists of a 128 bit key stream that is used to encrypt the data of the packet being encrypted (the plaintext) via an exclusive or function, which results in the encrypted data (the ciphertext). Then, for the next data packet to be encrypted, the same process occurs with the 32 bit counter being increased to a one value, for the next data packet two value, for the next data packet of three value, and so on. Generally, the 128 bit initiation vector/counter data is transmitted with every encrypted data packet. At the receiver end, the decryption is performed in a similar manner, based on the initiation vector and 32 bit counter provided for each block of encrypted data, the known encryption key and the received ciphertext data. Accordingly, with the traditional AES encryption protocols, the encryptor and decryptor are synchronized by explicitly providing the 128 bit encryption data sequence (the counter) with every encrypted data packet or data block.

In accordance with further example embodiments of the present invention, with regard to cryptographic synchronization of the enhanced encryption protocols employed between the UT and the SBSS, various methods are provided. First, in the case of constant data rate traffic (e.g. VoIP data traffic), where data (e.g., voice data) is transmitted in every frame of the data stream, a protocol is provided for maintaining synchronization of the initiation vector and counter data between the UT and the SBSS. As an initial matter, as described above, to provide maximum spectrally efficiency over the satellite channel (e.g., for a VoIP data session), all packet overhead is removed and only the payload voice frames are transmitted. The voice data payload of each frame is thus transmitted without header information, and hence the 128 bit encryption data sequence cannot be provided with the encrypted voice data.

Figure 10A:
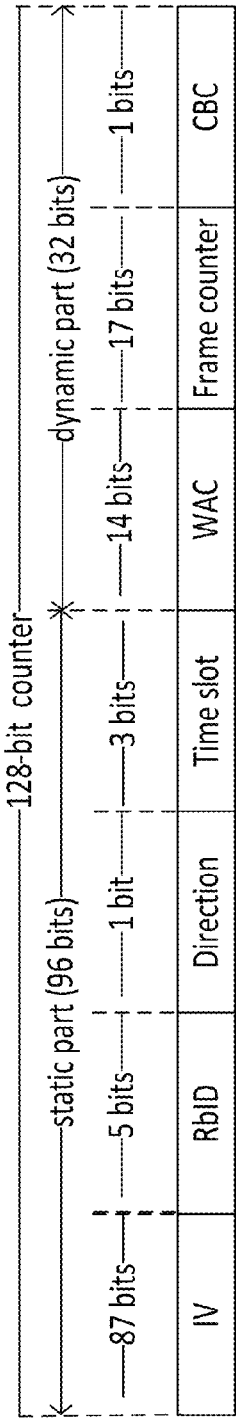
FIG. 10A illustrates a diagram of a 128-bit data sequence employed for encryption and decryption of constant rate data traffic (e.g., VoIP data traffic), transmitted over a dedicated channel, based on an AES encryption protocol, in accordance with example embodiments.

FIG. 10A illustrates a diagram of a 128-bit data sequence employed for encryption and decryption of constant rate data traffic (e.g., VoIP data traffic), transmitted over a dedicated channel, based on an AES encryption protocol, in accordance with example embodiments of the present invention. With reference to FIG. 10, the 96 bit static part of the 128 bit encryption sequence comprises an 87 bit initiation vector, a five bit radio bearer ID, a one bit direction flag, and a three bit timeslot indicator. The 32 bit dynamic part comprises a 14 bit wraparound counter (WAC), a 17 bit frame counter, and a one bit cipher block counter (CBC). Based on the illustrated 128 bit data sequence, according to an example embodiment, an approach is provided whereby the SBSS and UT are able to maintain cryptographic synchronization irrespective of the ability (or lack thereof) to transmit cryptographic header information with the encrypted packets. By way of example, according to one approach, the initiation vector is negotiated and established during the initial key exchange protocol (KEP) process performed between the UT in the SBSS (at UT initialization). Both the UT in the SBSS thereby acquire and maintain knowledge of the initiation vector. Further, during the security mode command and security mode complete message exchange, based on negotiation and establishment of a frame reference number where the switch between the KASUMI (f8) encryption protocol and the AES encryption protocol, the UT and SBSS each establishes a frame reference where the counter begins at zero. Based on that frame reference point, the UT and SBSS can track and increment the counter value with each frame. Cryptographic synchronization is thereby achieved by leveraging system defined frame identifier numbers (TDMA frame numbers) and, because the two ends no exactly when the enhanced encryption protocol begins there is no loss of synchronization.

Accordingly, for each given frame, the data is encrypted based on the session encryption key and the 128 bit data sequence (comprising the initiation vector and 32 bit counter), wherein the 17 bit frame counter is incremented on a frame by frame basis with the negotiated reference frame starting point as a zero starting value for the counter. For example, the first data frame designated as the beginning frame for the switch to the enhanced AES encryption protocol is encrypted based on the 128 bit data sequence, comprising the initiation vector and a 17 bit frame counter value of zero, and the previously established communications session encryption key. Specifically, the 128 bit sequence along with the session key is fed into the AES-256 encryption engine to generate the 128 bit encryption keystream. The key stream and the received plaintext of the VoIP session data are XORed or to generate the encrypted ciphertext. The ciphertext is then passed to the physical layer of the satellite chipset for encoding, modulation and transmission over the satellite channel. Further, every time the session key is changed, as discussed above, the UT and SBSS establish a new frame reference number four initiation of the new session key. In that regard, the frame counter of the 128 bit encryption data sequence can be reset to zero at the point in time with respect to the encryption decryption of the first data frame using the new session encryption key.

At the receiver, the received ciphertext transmitted over the satellite channel his first pass through the physical layer of the receiver satellite chipset for demodulation and decoding. The decoded data is then passed to the RLC/MAC layer of the receiver satellite chipset for deciphering of the encryption. The decryption engine of the receiver satellite chipset possesses all the required data for deciphering the encryption. As a result of the KEP process, the receiver satellite chipset possesses the session encryption key and the initiation vector of the 128 bit data sequence. Further, based on the knowledge of the start reference frame for the beginning of the enhanced encryption and the tracking of the frame counter incremented on a frame by frame basis, the receiver satellite chipset also maintains knowledge of the counter value used in the encryption of the data frame. Accordingly, the receiver satellite chipset is able to decipher the encryption of the received data frame. Moreover, the receiver satellite chipset is capable of decrypting any given frame of ciphertext data based on: (1) the known initiation vector (established during the KEP initialization process); (2) the respective 32 bit counter value being tracked from the negotiated reference frame starting point; (3) the data session encryption key (also established during the KEP initialization process); and (4) the received ciphertext for the respective data frame.

With further regard to VoIP data session traffic, as mentioned above with regard to the AES counter mode, the encryption keystream is generated on a 128 bit basis. Then considering a 2.45 kbps vocoder, 98 bits of voice data payload are generated and transmitted every 40 ms (every frame). Accordingly, for a 2.45 kbps vocoder, every 98 bit sequence of voice data payload is encrypted based on a 128 bit keystream, and the ciphertext is truncated at the 98 bit voice data sequence boundary. Considering a 4.0 kbps vocoder, however, 160 bits the voice data payload are generated in transmitted every 40 ms (every frame), and the 128 bit keystream is insufficient for encrypting an entire 160 bit data frame of voice payload. To address this situation, therefore, in accordance with a further example embodiment, an approach is provided for encrypting and decrypting the 160 bit data frame of a 4.0 kbps vocoder as a single frame. According to this approach, the one bit cipher block counter (CBC) is used in the encryption and decryption of the first 128 bits of the 160 bit data frame and the remaining 32 bits of the data frame. By way of example, the first 128 bits of payload are encrypted based on the session key and the 128 bit sequence, with a frame counter value for the respective data frame and the CBC value of zero. The remaining 32 bits of the data frame are encrypted based on the session key and the 128 bit sequence, with a frame counter value for the same data frame and the CBC value now set at one. At the receiver end, the receiver satellite chipset knows that the encrypted data sequence is from a 4.0 kbps vocoder, and decrypts received ciphertext data accordingly. For example, for each encrypted data frame, the receiver chipset will decrypt the first 128 bits of ciphertext data based on the respective frame counter value and a CBC value of zero, and will decrypt the next 32 bits of ciphertext data based on the same frame counter and the CBC value of one. Accordingly, the frame counter is only incremented for every voice data frame, and thus is not incremented between the encryption/decryption of the first 128 bits and the remaining 32 bits. Further, initialization vector provides for a unique value for every new radio bearer. The wraparound counter increases by one any time the frame counter wraps around back to zero.

Next, considering data traffic carried over a packet data channel, because data traffic is transmitted on a bandwidth on demand basis, the data traffic is not necessarily transmitted in every data frame. In the situation, therefore, a frame counter (which is incremented on a frame by frame basis) is not suitable for tracking the 128 bit data sequence necessary to decrypt the ciphertext of data traffic transmitted over a packet data channel. In accordance with further example embodiments, an approach is thus provided to address the situation of encryption and decryption of data traffic transmitted over a packet data channel.

Figure 10B:
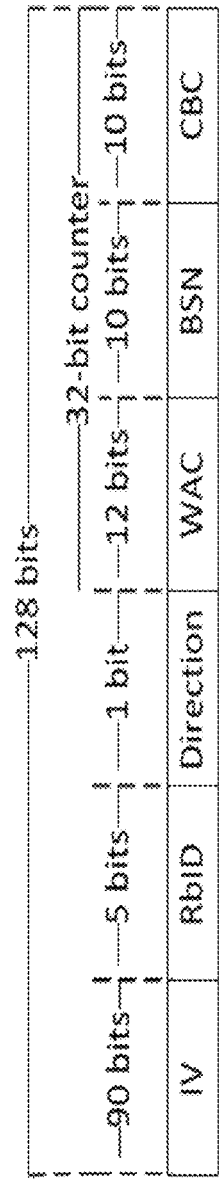
FIG. 10B illustrates a diagram of a 128-bit data sequence employed for encryption and decryption of packet data traffic (e.g., bulk data traffic), transmitted over a packet data channel, based on an AES encryption protocol, in accordance with example embodiments.

FIG. 10B illustrates a diagram of a 128-bit data sequence employed for encryption and decryption of packet data traffic (e.g., bulk data traffic), transmitted over a packet data channel, based on an AES encryption protocol, in accordance with example embodiments of the present invention. With reference to FIG. 10B, the 96 bit static part of the 128 bit encryption sequence comprises a 90 bit initiation vector, a five bit radio bearer ID, and a one bit direction flag. The 32 bit dynamic part comprises a 12 bit wraparound counter (WAC), a 10 bit block sequence number (BSN), and a 10 bit cipher block counter (CBC). Based on the illustrated 128 bit data sequence, according to an example embodiment, an approach is provided whereby the SBSS and UT are able to maintain cryptographic synchronization irrespective of the ability (or lack thereof) to track a frame count for the transmitted data on a frame by frame basis (as with constant VoIP data traffic).

By way of example, according to one approach, the initiation vector again is negotiated and established during the initial key exchange protocol (KEP) process performed between the UT in the SBSS (at UT initialization). Both the UT in the SBSS thereby acquire and maintain knowledge of the initiation vector. Further, during the security mode command and security mode complete message exchange, based on negotiation and establishment of a frame reference number where the switch between the KASUMI (f8) encryption protocol and the AES encryption protocol, the UT and SBSS each establishes a frame reference where the AES encryption begins. In this approach, the BSN of the 32-bit counter portion of the 128 bit encryption data sequence indicates a block sequence number for the respective data block being transmitted over the packet data channel. The BSN is incremented by one for every RLC data block. In the case of an RLC data block of a length that exceeds 128 bits, encryption of the data block will require multiple 128 bit keystreams. Accordingly, for each 128 bit sequence of ciphertext from the encryption of a given RLC data block, the BSN will not be incremented. In this situation, for each successive 128 bits of ciphertext from a given RLC block, the CBC is incremented. At the receiver end, therefore, the decryptor will decipher each 128 bit sequence of ciphertext from a given RLC data block based on the session key, the known initiation vector, and the 32-bit dynamic counter (which includes the block sequence number for the respective RLC data block and a CBC value for the respective 128 bit sequence within that RLC data block). For example, with a data traffic block of 600 bits the block will be encrypted based on the AES encryption protocol 5 times. For each of those five encryption sequences the BSN portion of the 32-bit counter remains constant, while the CBC part of the counter increases by one for each successive encryption sequence (it will increase by one 5 times). Again, the wraparound counter increases by one every time the BSN wraps around back to zero, and the initiation vector facilitates a unique counter for every new radio bearer. Further, in the case of data traffic over a packet data channel, headers are included with the data transmissions, and thus the 128 bit encryption data sequence can be sent with each RLC block. For example, the RLC/MAC layer, every transmitted RLC block includes an RLC header that contains the respective block sequence number.

Further, in the case where an encrypted data sequence of an RLC data block is not successfully received, that sequence must be retransmitted. In the case of a retransmission, however, the retransmitted data will be transmitted within different TDMA frames and thus would be associated with different TDMA frame numbers. Therefore, if the encryption and decryption were based on a 128 bit encryption data sequence using frame numbers, then the retransmitted sequence would have to be re-encrypted using the appropriate 128 bit encryption data sequence (using the new frame numbers). In order not to overburden the system with the re-encryption of the retransmitted data sequence, the approaches of the present embodiments address this scenario based on the synchronization between the encryption and decryption based on block sequence numbers instead of frame numbers. Based on the block sequence number, and the state of the CBC within the block, the decryptor can still decrypt the retransmitted data sequence based on the session encryption key and the 128 bit data sequence (using the correct BSN and CBC). The one exception to this is where the session encryption key changes before the retransmission of an encrypted data block sequence. In this case, the retransmitted data block sequence will be re-encrypted with the new session encryption key, and the decryptor will know to use the new session key based on the frame reference indicating the point in time when the new session key goes into effect. In other words, in some instances, retransmitted data block may be encrypted based on the new session key or the initiation of a change to a different encryption protocol. The activation of a new session key or the switching from a prior encryption protocol (e.g., the KASUMI (f8) protocol) to the enhanced encryption protocol (e.g., AES-256) occurs on a frame number basis, and the encryption/decryption of the data is based on a 128 bit data sequence that reflects the respective block sequence number of the encrypted data block.

Figure 10C:
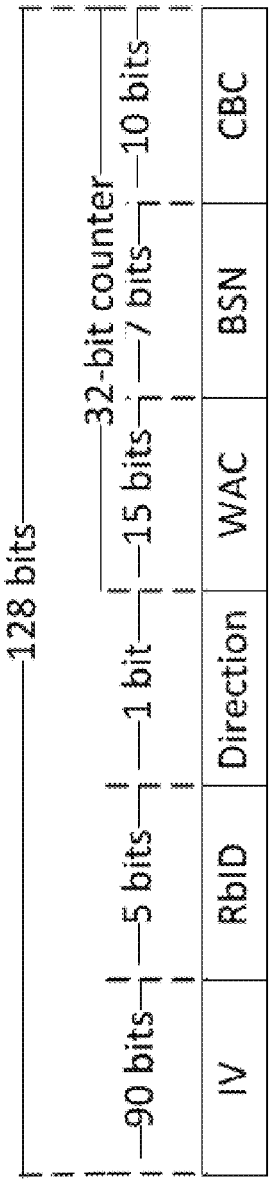
FIG. 10C illustrates a diagram of a 128-bit data sequence employed for encryption and decryption of packet data traffic (e.g., bulk data traffic), transmitted over a dedicated data channel, based on an AES encryption protocol, in accordance with example embodiments.

In accordance with further example embodiments, it will be recognized that the same concepts as employed by the 128 bit encryption data sequence approaches illustrated in FIGS. 10A and 10B can be implemented in different fashions. For example the bit counts of the frame counter for the constant rate applications data (e.g., the VoIP traffic), and for the block sequence number counter for the block data applications, along with the respective cipher block counters and wraparound counters, may be varied based on different constraints or requirements of the system. For example, FIG. 10C illustrates a diagram of a 128-bit data sequence employed for encryption and decryption of packet data traffic (e.g., bulk data traffic), transmitted over a dedicated data channel, based on an AES encryption protocol, in accordance with example embodiments of the present invention. With reference to FIG. 10C in this embodiment, while the WAC is 15 bits, the BSN is seven bits and the CBC is 10 bits, the BSN still reflects the sequence number for the respective RLC data block from which they encrypted ciphertext data arose, the CBC reflects the particular encryption sequence within that RLC data block, and the WAC reflects the wraparound count for the BSN.

According to yet a further example embodiment, in the case of a multicast data session, an approach is provided for efficient application of an enhanced data encryption protocol to the data traffic of the multicast data session. With respect to a multicast data session, however, because each UT participating in the multicast session will have it different data session encryption key, an approach must be provided to facilitate the encryption and decryption by the SBSS, for example, of the data to and from the multicast participants. According to this approach, since each participant UT possesses a unicast data session encryption key, the SBSS can communicate with each such UT, on the secure basis, via encrypted unicast communications to each UT utilizing the respective UT session encryption key. Accordingly, the SBSS, via an encrypted unicast transmission, sends a multicast session encryption key to each participating UT based on the respective encryption key of that UT. From there the encryption and decryption of the multicast session data occurs using the newly provided multicast data session encryption key, based on the foregoing described protocols of the example embodiments (e.g., the foregoing periodic key changes can be implemented from multicast session in the same manner as previously described, except that the new multicast session key must again be sent to each participating UT via the respective unicast encryption channel for each participating UT).

Figure 11:
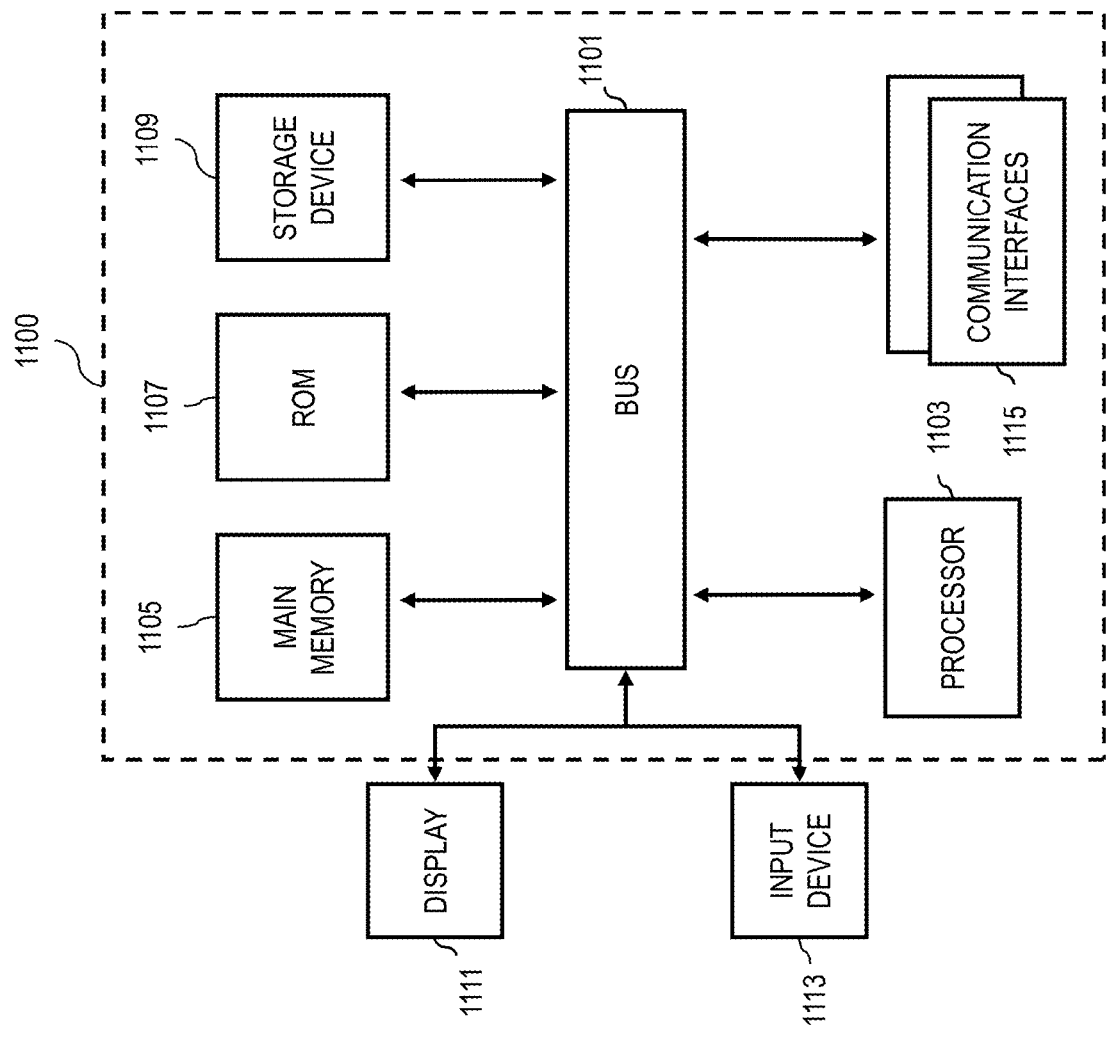
FIG. 11 is a diagram of hardware that can be used to implement certain embodiments.

FIG. 11 illustrates example hardware that can be used to implement certain embodiments. A computing system 1100 includes a bus 1101 or other communication mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communication interface 1115 coupled to bus 1101. The communication interface 1115 provides a two-way data communication coupling to a network link (not shown). The communication interface 1115 sends and receives electrical, electromagnetic, or optical signals that carry digital data streams representing various types of information. Further, the communication interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
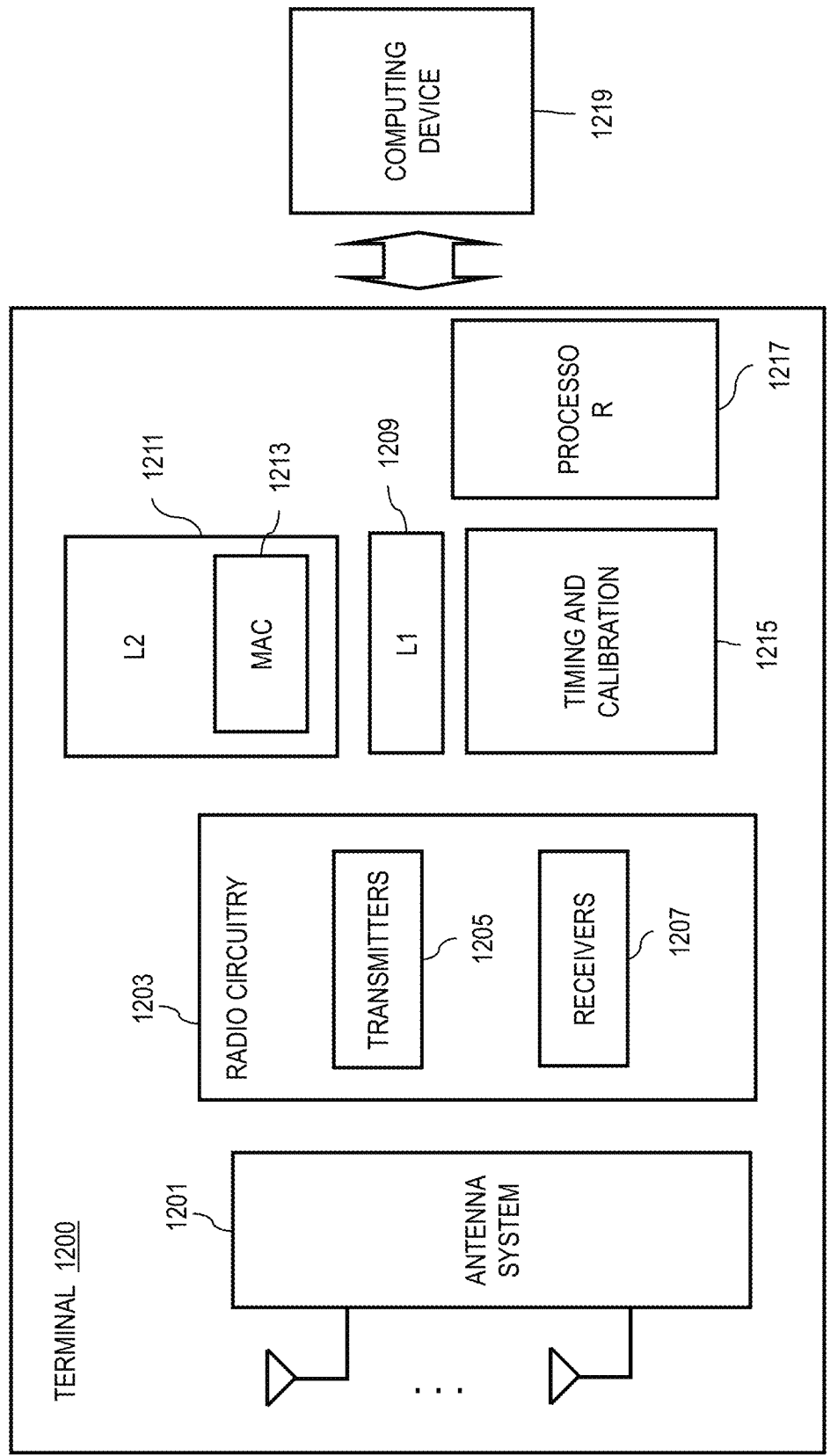
FIG. 12 is a diagram of example components of a user terminal configured to operate in the systems of FIGS. 1A and 1B, according to an example embodiment.

FIG. 12 is a diagram of example components of a user terminal configured to operate in the systems of FIGS. 1A and 1B, according to an example embodiment. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). Module 1213 executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
performing, by a communications terminal of a mobile communications network, an authentication function with a remote gateway node of the mobile communication network, including generating a first data encryption key configured for a first level of encryption for session data of a communications session of the communications terminal and an authentication key configured for authentication security protection for control layer messaging, wherein the session data and the control layer messaging are to be transmitted between the communications terminal and the remote gateway node over one or more channels of the communications network;
receiving, by the communications terminal, a security mode command from the remote gateway node, wherein the security mode command includes a key indicator;
generating, by the communications terminal, a second data encryption key based on the key indicator and a first key algorithm secured for the communications terminal, wherein the second data encryption key is generated for a second level of encryption for the session data, wherein the second level of encryption is at a higher security level as compared to the first level of encryption; and
generating, by the communications terminal, a key indicator response based on the key indicator, and transmitting a security mode complete command including the key indicator response to the remote gateway node, wherein the key indicator response is configured to enable the remote gateway node to generate the second data encryption key based on the key indicator response and a second key algorithm secured for the remote gateway node.

2. The method of claim 1, further comprising:
performing one or more packet data protocol (PDP) context activation processes over at least one of the channels of the communications network, wherein messaging for the PDP context activation processes is encrypted at the second level of encryption based on the second data encryption key.

3. The method of claim 1, further comprising:
encrypting the session data at the second level of encryption based on the second data encryption key; and
transmitting the encrypted session data to the remote gateway node as part of the communications session of the communications terminal.

4. The method of claim 1, wherein the one of more channels of the mobile communications network consist of wireless communications channels and the communications terminal is a wireless mobile user terminal, and wherein the remote gateway node comprises a base station of the mobile communications network.

5. The method of claim 4, wherein the mobile communications network is a mobile satellite communications network and the wireless communications channels are satellite communications channels, the communications terminal is a mobile satellite user terminal, and the base station is a satellite base station subsystem that serves as an interface between the satellite communications channels and a core network of a terrestrial communications system.

6. The method of claim 5, further comprising:
encrypting the session data at the second level of encryption based on the second data encryption key; and
transmitting the encrypted session data to the remote gateway node as part of the communications session of the communications terminal.

7. The method of claim 1, wherein the generation of the second data encryption key and of the key indicator response are performed at a radio resource control layer of the communications terminal.

8. The method of claim 1, wherein the generation of the second data encryption key and of the key indicator response are performed at an applications layer of the communications terminal.

9. The method of claim 8, wherein the key indicator is received by the applications layer directly from a radio resource control layer of the communications terminal, and wherein the key indicator response is transmitted directly to the radio resource control layer.

10. A communications terminal apparatus of a mobile communications network, comprising:
a processing circuit; and
a memory including program code, wherein the program code is configured to be executed by the processing circuit, and
wherein, as a result of the execution of the program code, the processing circuit is configured to cause the communications terminal apparatus to perform at least the following,
performing an authentication function with a remote gateway node of the mobile communication network, including generating a first data encryption key configured for a first level of encryption for session data of a communications session of the communications terminal and an authentication key configured for authentication security protection for control layer messaging, wherein the session data and the control layer messaging are to be transmitted between the communications terminal and the remote gateway node over one or more channels of the communications network;

receiving a security mode command from the remote gateway node, wherein the security mode command includes a key indicator, generating a second data encryption key based on the key indicator and a first key algorithm secured for the communications terminal, wherein the second data encryption key is generated for a second level of encryption for the session data, wherein the second level of encryption is at a higher security level as compared to the first level of encryption, and generating a key indicator response based on the key indicator, and transmitting a security mode complete command including the key indicator response to the remote gateway node, wherein the key indicator response is configured to enable the remote gateway node to generate the second data encryption key based on the key indicator response and a second key algorithm secured for the remote gateway node.

11. The communications terminal apparatus of claim 10, wherein the apparatus is further caused to perform at least the following:

performing one or more packet data protocol (PDP) context activation processes over at least one of the channels of the communications network, wherein messaging for the PDP context activation processes is encrypted at the second level of encryption based on the second data encryption key.

12. The communications terminal apparatus of claim 10, wherein the apparatus is further caused to perform at least the following:

encrypting the session data at the second level of encryption based on the second data encryption key; and transmitting the encrypted session data to the remote gateway node as part of the communications session of the communications terminal.

13. The communications terminal apparatus of claim 10, wherein the one of more channels of the mobile communications network consist of wireless communications channels and the communications terminal apparatus is a wireless mobile user terminal, and wherein the remote gateway node comprises a base station of the mobile communications network.

14. The communications terminal apparatus of claim 13, wherein the mobile communications network is a mobile satellite communications network and the wireless communications channels are satellite communications channels, the communications terminal apparatus is a mobile satellite user terminal, and the base station is a satellite base station subsystem that serves as an interface between the satellite communications channels and a core network of a terrestrial communications system.

15. The communications terminal apparatus of claim 14, wherein the apparatus is further caused to perform at least the following:

encrypting the session data at the second level of encryption based on the second data encryption key; and transmitting the encrypted session data to the remote gateway node as part of the communications session of the communications terminal.

16. The communications terminal apparatus of claim 10, wherein the generation of the second data encryption key and of the key indicator response are performed at a radio resource control layer of the apparatus.

17. The communications terminal apparatus of claim 10, wherein the generation of the second data encryption key and of the key indicator response are performed at an applications layer of the apparatus.

18. The communications terminal apparatus of claim 17, wherein the key indicator is received by the applications layer directly from a radio resource control layer of the communications terminal apparatus, and wherein the key indicator response is transmitted directly to the radio resource control layer.

19. The communications terminal apparatus of claim 10, further comprising:

an applications processor circuit at an applications layer of the apparatus, wherein the generation of the second data encryption key and of the key indicator response are performed by the applications processor circuit.

20. The communications terminal apparatus of claim 10, further comprising:

an applications processor circuit at an applications layer of the apparatus; and a key exchange protocol circuit separate from the applications processor circuit, wherein the generation of the second data encryption key and of the key indicator response are performed by the key exchange protocol circuit.

21. The communications terminal apparatus of claim 10, further comprising:

an applications processor circuit at an applications layer of the apparatus; and an encryption circuit separate from the applications processor circuit, wherein the encryption circuit performs the generation of the second data encryption key and of the key indicator response; and wherein the encryption circuit further performs encryption of the session data at the second level of encryption based on the second data encryption key.

* * * * *